US010434547B2

(12) United States Patent
Turner et al.

(10) Patent No.: US 10,434,547 B2
(45) Date of Patent: Oct. 8, 2019

(54) PIPELINE INSPECTION DEVICE

(71) Applicant: MILWAUKEE ELECTRIC TOOL CORPORATION, Brookfield, WI (US)

(72) Inventors: Christopher J. Turner, Pewaukee, WI (US); Gareth Mueckl, Milwaukee, WI (US); Samuel J. Krohlow, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 15/844,270

(22) Filed: Dec. 15, 2017

(65) Prior Publication Data

US 2018/0169719 A1 Jun. 21, 2018

Related U.S. Application Data

(60) Provisional application No. 62/447,102, filed on Jan. 17, 2017, provisional application No. 62/434,786, filed on Dec. 15, 2016.

(51) Int. Cl.
*G03B 37/00* (2006.01)
*B08B 9/043* (2006.01)
(Continued)

(52) U.S. Cl.
CPC ........... *B08B 9/043* (2013.01); *B65H 75/403* (2013.01); *B65H 75/4471* (2013.01); *E03F 7/12* (2013.01)

(58) Field of Classification Search
CPC .... B08B 9/043; G03B 37/005; B65H 75/403; B65H 75/4471; E03F 7/12
(Continued)

(56) References Cited

U.S. PATENT DOCUMENTS 4,255,762 A 3/1981 Takeyasu et al.
4,611,360 A 9/1986 Irwin
(Continued)

FOREIGN PATENT DOCUMENTS

DE 202005002976 8/2005
EP 0987541 3/2000
(Continued)

OTHER PUBLICATIONS

International Search Report and Written Opinion for Application No. PCT/US2017/066821 dated Apr. 9, 2018, 10 pages.
(Continued)

*Primary Examiner* — John R Schnurr
(74) *Attorney, Agent, or Firm* — Michael Best & Friedrich LLP

(57) ABSTRACT

A pipeline inspection device including a cable having a camera disposed on a distal end of the cable, where the camera and the cable are configured to be directed into a conduit. A first drum includes a rear wall, a front wall, and a side wall defining an interior, where the front wall has an opening providing access to the interior, and where the cable is disposed at least partially within the first drum. A stand supports the first drum, where the first drum is rotatably coupled to the stand. A hub houses electrical components of the pipeline inspection device. The hub is removably received in the interior of the first drum via the opening, where the hub is selectively removable from the first drum and insertable into an interior of a second drum.

6 Claims, 23 Drawing Sheets

(51) Int. Cl.

| | |
|---|---|
| ***E03F 7/12*** | (2006.01) |
| ***B65H 75/40*** | (2006.01) |
| ***B65H 75/44*** | (2006.01) |

(58) Field of Classification Search

USPC ........................................................... 348/84

See application file for complete search history.

(56) References Cited

U.S. PATENT DOCUMENTS

| | | | |
|---|---|---|---|
| 4,725,883 | A | 2/1988 | Clark, Jr. et al. |
| 4,913,558 | A | 4/1990 | Wettervik et al. |
| 4,974,168 | A | 11/1990 | Marx |
| 5,309,595 | A | 5/1994 | Salecker et al. |
| 5,754,220 | A | 5/1998 | Smalser, Sr. |
| 6,545,704 | B1 | 4/2003 | Olsson et al. |
| 6,697,102 | B1 | 2/2004 | Olsson et al. |
| 6,831,679 | B1 | 12/2004 | Olsson et al. |
| 6,846,285 | B2 | 1/2005 | Hasegawa et al. |
| 6,862,945 | B2 | 3/2005 | Chapman et al. |
| 6,908,310 | B1 | 6/2005 | Olsson et al. |
| 6,931,149 | B2 | 8/2005 | Hagene et al. |
| 6,958,767 | B2 | 10/2005 | Olsson et al. |
| 7,009,399 | B2 | 3/2006 | Olsson et al. |
| 7,044,623 | B2 | 5/2006 | Olsson et al. |
| 7,104,951 | B2 | 9/2006 | Hasegawa et al. |
| 7,136,765 | B2 | 11/2006 | Maier et al. |
| 7,164,476 | B2 | 1/2007 | Shima et al. |
| 7,221,136 | B2 | 5/2007 | Olsson et al. |
| 7,298,126 | B1 | 11/2007 | Olsson et al. |
| 7,332,901 | B2 | 2/2008 | Olsson et al. |
| 7,336,078 | B1 | 2/2008 | Merewether et al. |
| 7,359,611 | B1 | 4/2008 | Kaplan |
| 7,443,154 | B1 | 10/2008 | Merewether et al. |
| 7,498,797 | B1 | 3/2009 | Olsson et al. |
| 7,498,816 | B1 | 3/2009 | Olsson et al. |
| 7,518,374 | B1 | 4/2009 | Olsson et al. |
| 7,557,559 | B1 | 7/2009 | Olsson et al. |
| 7,619,516 | B2 | 11/2009 | Olsson et al. |
| 7,676,879 | B1 | 3/2010 | Rutenberg et al. |
| 7,715,701 | B2 | 5/2010 | Lange |
| 7,733,077 | B1 | 6/2010 | Merewether et al. |
| 7,741,848 | B1 | 6/2010 | Olsson et al. |
| 7,825,647 | B2 | 11/2010 | Olsson et al. |
| 7,830,149 | B1 | 11/2010 | Olsson et al. |
| 7,863,885 | B1 | 1/2011 | Olsson et al. |
| 7,948,236 | B1 | 5/2011 | Olsson et al. |
| 7,990,151 | B2 | 8/2011 | Olsson et al. |
| 8,013,610 | B1 | 9/2011 | Merewether et al. |
| 8,033,677 | B1 | 10/2011 | Olsson et al. |
| 8,035,390 | B2 | 10/2011 | Olsson et al. |
| 8,106,660 | B1 | 1/2012 | Merewether et al. |
| 8,167,468 | B1 | 5/2012 | Olsson et al. |
| 8,172,434 | B1 | 5/2012 | Olsson |
| 8,176,593 | B2 | 5/2012 | Gress et al. |
| 8,203,343 | B1 | 6/2012 | Olsson et al. |
| 8,248,056 | B1 | 8/2012 | Olsson et al. |
| 8,264,226 | B1 | 9/2012 | Olsson et al. |
| 8,279,278 | B2 | 10/2012 | Park et al. |
| 8,289,385 | B2 | 10/2012 | Olsson et al. |
| 8,395,661 | B1 | 3/2013 | Olsson et al. |
| 8,400,154 | B1 | 3/2013 | Olsson et al. |
| 8,413,347 | B2 | 4/2013 | Gress et al. |
| 8,540,429 | B1 | 9/2013 | Olsson et al. |
| 8,547,428 | B1 | 10/2013 | Olsson et al. |
| 8,564,295 | B2 | 10/2013 | Olsson et al. |
| 8,587,648 | B2 | 11/2013 | Olsson et al. |
| 8,616,725 | B2 | 12/2013 | Olsson et al. |
| 8,616,734 | B2 | 12/2013 | Olsson |
| 8,632,230 | B2 | 1/2014 | Olsson et al. |
| 8,635,043 | B1 | 1/2014 | Olsson et al. |
| 8,717,028 | B1 | 5/2014 | Merewether et al. |
| 8,773,133 | B1 | 7/2014 | Olsson et al. |
| 8,864,326 | B2 | 10/2014 | Armer et al. |
| 8,908,027 | B2 | 12/2014 | Kleyn et al. |
| 8,931,131 | B1 | 1/2015 | Feduke |
| 8,970,211 | B1 | 3/2015 | Olsson et al. |
| 8,984,698 | B1 | 3/2015 | Olsson |
| 9,019,364 | B2 | 4/2015 | Brignac et al. |
| 9,041,794 | B1 | 5/2015 | Olsson et al. |
| 9,057,754 | B2 | 6/2015 | Olsson et al. |
| 9,080,992 | B2 | 7/2015 | Olsson et al. |
| 9,081,109 | B1 | 7/2015 | Olsson et al. |
| 9,082,269 | B2 | 7/2015 | Olsson et al. |
| 9,091,416 | B1 | 7/2015 | Olsson et al. |
| 9,134,255 | B1 | 9/2015 | Olsson et al. |
| 9,134,817 | B2 | 9/2015 | Olsson |
| 9,143,740 | B2 | 9/2015 | Hansen et al. |
| 9,151,484 | B1 | 10/2015 | Olsson et al. |
| 9,207,350 | B2 | 12/2015 | Olsson et al. |
| 9,222,809 | B1 | 12/2015 | Olsson et al. |
| 9,234,812 | B2 | 1/2016 | Krywyj |
| 9,239,512 | B2 | 1/2016 | Foss et al. |
| 9,277,105 | B2 | 3/2016 | Olsson et al. |
| 9,285,109 | B1 | 3/2016 | Olsson et al. |
| 9,304,055 | B2 | 4/2016 | Hansen et al. |
| 9,316,387 | B1 | 4/2016 | Olsson et al. |
| 9,341,740 | B1 | 5/2016 | Olsson et al. |
| 9,372,117 | B2 | 6/2016 | Olsson et al. |
| 9,388,973 | B1 | 7/2016 | Olsson et al. |
| 9,411,066 | B1 | 8/2016 | Olsson et al. |
| 9,411,067 | B2 | 8/2016 | Olsson et al. |
| 9,416,957 | B2 | 8/2016 | Olsson et al. |
| 9,429,301 | B2 | 8/2016 | Olsson et al. |
| 9,435,907 | B2 | 9/2016 | Olsson et al. |
| 9,448,376 | B2 | 9/2016 | Chapman et al. |
| 9,465,129 | B1 | 10/2016 | Olsson et al. |
| 9,468,954 | B1 | 10/2016 | Olsson et al. |
| 9,477,147 | B2 | 10/2016 | Chapman et al. |
| 9,488,747 | B2 | 11/2016 | Olsson et al. |
| 9,494,706 | B2 | 11/2016 | Olsson et al. |
| 9,506,628 | B1 | 11/2016 | Merewether et al. |
| 9,512,988 | B2 | 12/2016 | Olsson et al. |
| 9,521,303 | B2 | 12/2016 | Olsson et al. |
| 9,523,788 | B1 | 12/2016 | Olsson et al. |
| 9,571,326 | B2 | 2/2017 | Bench et al. |
| 9,574,760 | B1 | 2/2017 | Olsson et al. |
| 9,599,740 | B2 | 3/2017 | Olsson |
| 9,625,602 | B2 | 4/2017 | Olsson |
| 9,632,202 | B2 | 4/2017 | Olsson et al. |
| 9,634,878 | B1 | 4/2017 | Bench et al. |
| 9,638,824 | B2 | 5/2017 | Olsson et al. |
| 9,684,090 | B1 | 6/2017 | Olsson et al. |
| 9,696,447 | B1 | 7/2017 | Olsson et al. |
| 9,696,448 | B2 | 7/2017 | Olsson et al. |
| 9,703,002 | B1 | 7/2017 | Olsson et al. |
| 9,746,170 | B1 | 8/2017 | Armer et al. |
| 9,746,572 | B2 | 8/2017 | Olsson et al. |
| 9,746,573 | B1 | 8/2017 | Olsson et al. |
| 9,769,366 | B2 | 9/2017 | Olsson et al. |
| 9,784,837 | B1 | 10/2017 | Olsson et al. |
| 9,791,382 | B2 | 10/2017 | Olsson et al. |
| 9,798,033 | B2 | 10/2017 | Olsson et al. |
| 9,824,433 | B2 | 11/2017 | Olsson et al. |
| 9,829,783 | B1 | 11/2017 | Chapman et al. |
| 9,835,564 | B2 | 12/2017 | Olsson et al. |
| 9,841,503 | B2 | 12/2017 | Olsson et al. |
| 9,863,590 | B2 | 1/2018 | Olsson et al. |
| 9,880,309 | B2 | 1/2018 | Merewether et al. |
| 9,891,337 | B2 | 2/2018 | Olsson et al. |
| 9,924,139 | B2 | 3/2018 | Olsson et al. |
| 9,927,368 | B1 | 3/2018 | Olsson et al. |
| 9,927,545 | B2 | 3/2018 | Olsson et al. |
| 9,927,546 | B2 | 3/2018 | Olsson et al. |
| 9,928,613 | B2 | 3/2018 | Olsson et al. |
| 9,945,976 | B2 | 4/2018 | Olsson et al. |
| 9,989,662 | B1 | 6/2018 | Olsson et al. |
| 10,001,425 | B1 | 6/2018 | Olsson et al. |
| 10,009,519 | B2 | 6/2018 | Olsson et al. |
| 10,024,366 | B2 | 7/2018 | Kleyn et al. |
| 10,024,994 | B1 | 7/2018 | Cox et al. |
| 10,031,253 | B2 | 7/2018 | Olsson et al. |
| 2002/0113870 | A1 | 8/2002 | Mueckl et al. |
| 2003/0052967 | A1 | 3/2003 | Brunton |
| 2007/0132842 | A1 | 6/2007 | Morris |

(56) References Cited

U.S. PATENT DOCUMENTS

| | | | | |
|---|---|---|---|---|
| 2008/0098544 | A1 | 5/2008 | Rutkowski et al. | |
| 2008/0229527 | A1 | 9/2008 | Berry | |
| 2010/0127922 | A1 | 5/2010 | Sooy | |
| 2010/0208056 | A1 * | 8/2010 | Olsson | H04N 7/185 348/84 |
| 2012/0069172 | A1 | 3/2012 | Hudritsch | |
| 2012/0147173 | A1 | 6/2012 | Lynch | |
| 2012/0203501 | A1 * | 8/2012 | Gress | B08B 9/045 702/151 |
| 2012/0206501 | A1 | 8/2012 | Gress et al. | |
| 2012/0211580 | A1 | 8/2012 | Kleyn et al. | |
| 2012/0242341 | A1 | 9/2012 | Olsson et al. | |
| 2013/0164567 | A1 | 6/2013 | Olsson et al. | |
| 2013/0214786 | A1 | 8/2013 | Hansen et al. | |
| 2013/0218485 | A1 | 8/2013 | Hansen et al. | |
| 2014/0111376 | A1 | 4/2014 | Bench et al. | |
| 2014/0152802 | A1 | 6/2014 | Olsson et al. | |
| 2014/0154535 | A1 | 6/2014 | Olsson et al. | |
| 2014/0159729 | A1 | 6/2014 | Olsson et al. | |
| 2014/0167766 | A1 * | 6/2014 | Olsson | G01V 3/165 324/329 |
| 2014/0168407 | A1 | 6/2014 | Olsson et al. | |
| 2014/0176696 | A1 | 6/2014 | Chapman et al. | |
| 2014/0210989 | A1 | 7/2014 | Olsson et al. | |
| 2014/0313316 | A1 | 10/2014 | Olsson et al. | |
| 2014/0313321 | A1 | 10/2014 | Olsson et al. | |
| 2015/0077120 | A1 | 3/2015 | Olsson et al. | |
| 2015/0101896 | A1 | 4/2015 | Kleyn et al. | |
| 2015/0263434 | A1 * | 9/2015 | Bench | H01Q 21/24 342/357.51 |
| 2015/0263469 | A1 | 9/2015 | Olsson | |
| 2015/0350506 | A1 * | 12/2015 | Olsson | G03B 37/005 348/84 |
| 2015/0355363 | A1 | 12/2015 | Merewether et al. | |
| 2016/0141766 | A1 | 5/2016 | Olsson et al. | |
| 2016/0173829 | A1 | 6/2016 | Olsson et al. | |
| 2016/0187522 | A1 | 6/2016 | Olsson et al. | |
| 2016/0261829 | A1 | 9/2016 | Olsson et al. | |
| 2016/0373619 | A1 | 12/2016 | Olsson et al. | |
| 2017/0015490 | A1 | 1/2017 | Olsson et al. | |
| 2017/0017010 | A1 | 1/2017 | Olsson et al. | |
| 2017/0023492 | A1 | 1/2017 | Olsson et al. | |
| 2017/0115424 | A1 | 4/2017 | Olsson et al. | |
| 2017/0128989 | A1 | 5/2017 | Olsson et al. | |
| 2017/0130950 | A1 | 5/2017 | Olsson et al. | |
| 2017/0131422 | A1 | 5/2017 | Olsson et al. | |
| 2017/0131423 | A1 | 5/2017 | Olsson et al. | |
| 2017/0131424 | A1 | 5/2017 | Olsson | |
| 2017/0134693 | A1 | 5/2017 | Chapman et al. | |
| 2017/0160420 | A1 | 6/2017 | Olsson et al. | |
| 2017/0163940 | A1 * | 6/2017 | Olsson | H04N 7/183 |
| 2017/0176344 | A9 | 6/2017 | Olsson et al. | |
| 2017/0191651 | A1 | 7/2017 | Merewether et al. | |
| 2017/0200352 | A1 | 7/2017 | Olsson et al. | |
| 2017/0235010 | A1 | 8/2017 | Olsson et al. | |
| 2017/0261196 | A1 | 9/2017 | Chapman et al. | |
| 2017/0261630 | A1 | 9/2017 | Olsson et al. | |
| 2017/0299757 | A1 | 10/2017 | Bench et al. | |
| 2017/0307670 | A1 | 10/2017 | Olsson | |
| 2017/0363764 | A1 | 12/2017 | Aldridge et al. | |
| 2018/0022535 | A9 | 1/2018 | Olsson et al. | |
| 2018/0038093 | A1 | 2/2018 | Olsson et al. | |
| 2018/0128931 | A1 | 5/2018 | Olsson et al. | |
| 2018/0165924 | A9 | 6/2018 | Olsson et al. | |
| 2018/0202940 | A1 | 7/2018 | Olsson et al. | |
| 2018/0231208 | A1 | 8/2018 | Chapman et al. | |

FOREIGN PATENT DOCUMENTS

| | | |
|---|---|---|
| EP | 2313211 | 9/2015 |
| JP | 2010096718 | 4/2010 |
| WO | 0107654 | 2/2001 |
| WO | 2012178205 | 12/2012 |
| WO | 2013074705 | 5/2013 |
| WO | 2013148714 | 10/2013 |
| WO | 2014145778 | 9/2014 |
| WO | 2016003938 | 1/2016 |
| WO | 2018112476 | 6/2018 |
| WO | 2018129549 | 7/2018 |
| WO | 2018132772 | 7/2018 |

OTHER PUBLICATIONS

Gen-Eye Prism Video Pipe Inspection System, <https://drainbrain.com/products/gen-eye-prism/> website available as early as Dec. 14, 2017.

YouTube, How to connect mobile devices to Gen-Eye Wi-Fi—Version 2.0, <https://www.youtube.com/watch?v=YKncdllQLA8> published Sep. 12, 2016.

* cited by examiner

PIPELINE INSPECTION DEVICE

CROSS-REFERENCE TO RELATED APPLICATIONS

The present application claims priority to U.S. Provisional Patent Application No. 62/434,786, filed Dec. 15, 2016, and U.S. Provisional Patent Application No. 62/447,102, filed Jan. 17, 2017, the entire contents of which are incorporated by reference herein.

FIELD OF INVENTION

The present invention relates to sewer inspection devices for inspecting sewers, drains, pipes, or other conduits.

BACKGROUND

Pipeline inspection devices can be used to determine the location of obstructions in underground pipes or find damaged areas that affect the integrity of pipe systems. Generally, a pipeline inspection device includes a cable that can be pushed down a length of the pipe. The end of the cable may include an imaging device, such as a video camera, to help identify an obstruction or damage within the pipe. The end of the cable may also include a location device, such as a sonde, to transmit the location of the end of the cable. The location device allows a user to find the end of the cable and dig down towards the pipe at the proper location where the obstruction might be.

SUMMARY

In one embodiment, the invention provides a pipeline inspection device including a cable having a camera disposed on a distal end of the cable, where the camera and the cable are configured to be directed into a conduit. A first drum includes a rear wall, a front wall, and a side wall defining an interior, where the front wall has an opening providing access to the interior, and where the cable is disposed at least partially within the first drum. A stand supports the first drum, where the first drum is rotatably coupled to the stand. A hub houses electrical components of the pipeline inspection device. The hub is removably received in the interior of the first drum via the opening, where the hub is selectively removable from the first drum and insertable into an interior of a second drum.

In another embodiment, the invention provides a pipeline inspection device including a cable having a camera disposed on a distal end of the cable, where the camera and the cable are configured to be directed into a conduit. A drum includes a rear wall, a front wall, and a side wall defining an interior, where the front wall has an opening providing access to the interior, and where the cable is disposed at least partially within the drum. A stand includes a base and a center support extending vertically from the base, where the drum is rotatably coupled to the center support. A handle assembly includes a first handle and a second handle extending outwardly from the center support in a horizontal direction. A hub houses electrical components of the pipeline inspection device, where the hub is received in the interior of the drum via the opening.

In yet another embodiment, the invention provides a pipeline inspection device including a cable including a camera disposed on a distal end of the cable, where the camera and the cable are configured to be directed into a conduit. A drum includes a rear wall, a front wall, and a side wall defining an interior, where the front wall has an opening providing access to the interior, and where the cable is disposed at least partially within the drum. A stand supports the drum, where the drum is rotatably coupled to the stand. A hub houses electrical components of the pipeline inspection device, where the hub is received in the interior of the drum via the opening. A battery housing is disposed on the hub, where the battery housing is configured to removably receive a battery.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 23:
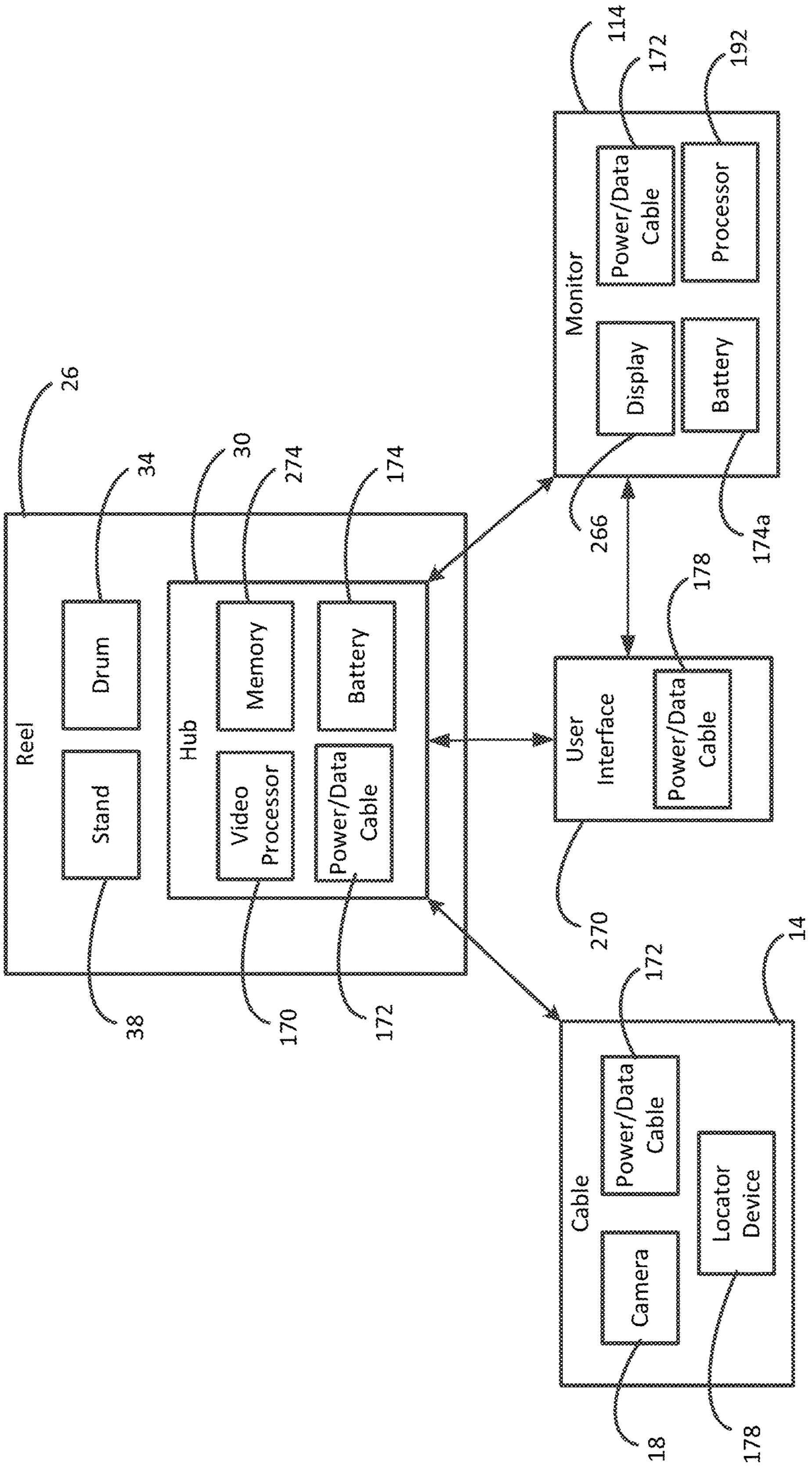
FIG. 23 is a schematic diagram of a pipeline inspection device according to one embodiment.
Figure 24:
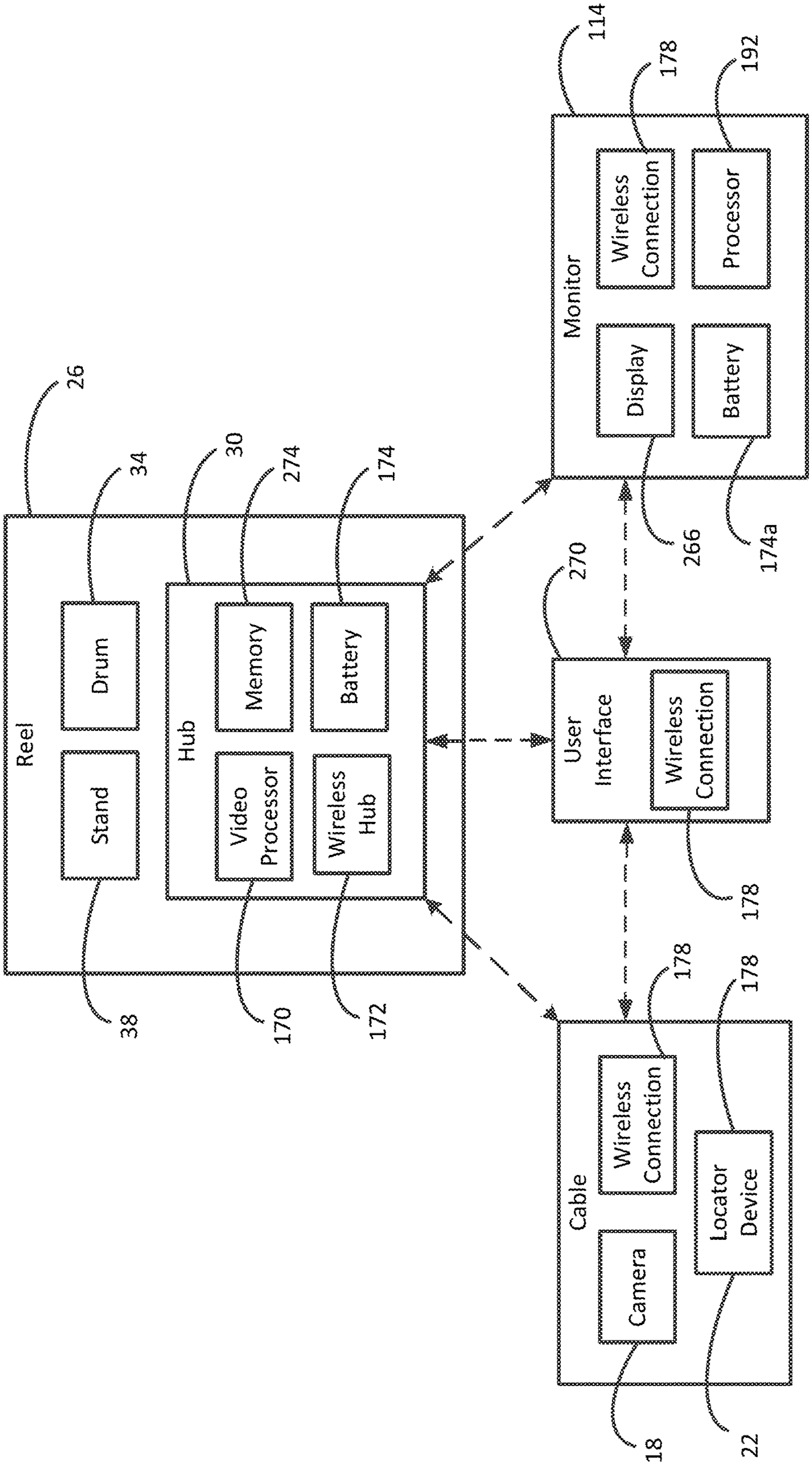
FIG. 24 is a schematic diagram of a pipeline inspection device according to another embodiment.

The invention disclosed herein provides a pipeline inspection device 10, as shown in FIGS. 23 and 24, that can be used to view the interior of the pipe, conduit, etc., such as a buried sewer pipeline to locate obstructions, blockages, and defects in the pipe. Specifically, a user can use the pipeline inspection device 10 to observe the interior of a pipe, often from a distance away from the closest access port to the sewer pipeline. To view the interior of the pipe, a cable 14 is directed down an access port of the pipe and through the sewer pipeline. The cable 14 includes an image capturing device (e.g., a camera 18) and/or a locator device 22 (e.g., a snode) connected at a distal end thereof, for viewing the interior 54 of the pipeline.

The pipeline inspection device 10 includes a reel 26 (FIGS. 1-4) for housing the cable 14 and a hub 30 (FIGS. 8-12) for housing a power source and other electronic components for operating the pipeline inspection device 10. The cable 14 is stored on the reel 26 in a wound configuration, but can be unwound and threaded through a length of a pipe under inspection. The hub 30 provides power to the components of the reel 26 in order to operate the pipeline inspection device 10. As discussed in in greater detail below, the hub 30 is removably coupled to the reel 26. In some embodiments, the hub 30 can be interchangeably used with two or more different reels 26.

FIGS. 1-7 illustrate one embodiment of a reel 26. The reel 26 includes a drum 34 for housing the cable 14 and a stand 38 for supporting the drum 34. The drum 34 includes a closed end defined by a back wall 42, and an open end defined by a front wall 46. A side wall 50 extends around the perimeter of the drum 34 between the front wall 46 and the back wall 42. Together, the back wall 42, the side wall 50, and front wall 46 define an interior 54 of the drum 34 that houses the cable 14. The front wall 46 includes an opening 58 that provides access to the interior 54 of the drum 34. As will be discussed in further detail below, the hub 30 (FIGS. 8-12) can be inserted into the drum 34 via the opening 58.

The drum 34 rotates about an axis extending through the back wall 42 and the opening 58 of the front wall 46. The cable 14 is stored within the interior 54 and is wound about the axis of the drum 34. The drum 34 can be different sizes in order to accommodate different size or lengths of cables 14. Because the cable 14 is stiff (e.g., a push cable 14), the cable 14 exerts an outward force towards the walls of the drum 34, and particularly, towards the side wall 50. Thus, the cable 14 frictionally engages the walls of the drum 34 such that the cable 14 rotates about the axis of the drum 34 as the drum 34 rotates. Rotation of the drum 34 in a first direction causes the cable 14 to unwind so that the cable 14 can be extended into the pipe. In some embodiments, the drum 34 can also be rotated in a second direction to retract the cable 14 from the pipe and wind cable 14 back into the drum 34. In some embodiments, the drum 34 includes ribs on the inside of the drum 34 to provide for increased frictional engagement with the cable 14.

The drum 34 is supported above the ground by the stand 38. The stand 38 includes a base 66 and a center support 70 extending upward from the base 66. In the embodiment illustrated in FIGS. 1-7, the base 66 includes a platform 74, two front feet 78 and two back wheels 82. To transport the reel 26, the center support 70 can be tilted backwards so that the front feet 78 are lifted off of the ground and the wheels 82 can be used to transport the reel 26. When in operation, the front feet 78 engage the ground to inhibit the reel 26 from moving. The wheels 82 are each connected to the platform 74 by an independent axle 86. In other words, in the illustrated embodiment, the wheels 82 are not connected to one another by a single axle 86 extending between both wheels 82. Rather, each wheel 82 is rotatably coupled to the platform 74 by a separate axle 86 that is capable of independent rotation.

The center support 70 includes one or more handles to help maneuver and operate the pipeline inspection device 10. In the illustrated embodiment, the center support 70 includes a first handle assembly 90, including a telescoping handle 94 that retracts into a hollow portion of the center support 70. The telescoping handle 94 can be adjusted between an extended position, for example during transportation, and a retracted position, for example during operation or while stored. When in the extended position, the telescoping handle 94 enables a user to transport the reel 26 in a similar way as a carry-on suitcase. When in the retracted position, the telescoping handle 94 is compactly stored within the center support 70. In the illustrated embodiment, the center support 70 is formed as an extruded aluminum frame 106. This provides for a lightweight material that can receive the handle when in the retracted position. However, in other embodiments, the center support 70 can be formed of steel tubing or other materials.

Figure 1:
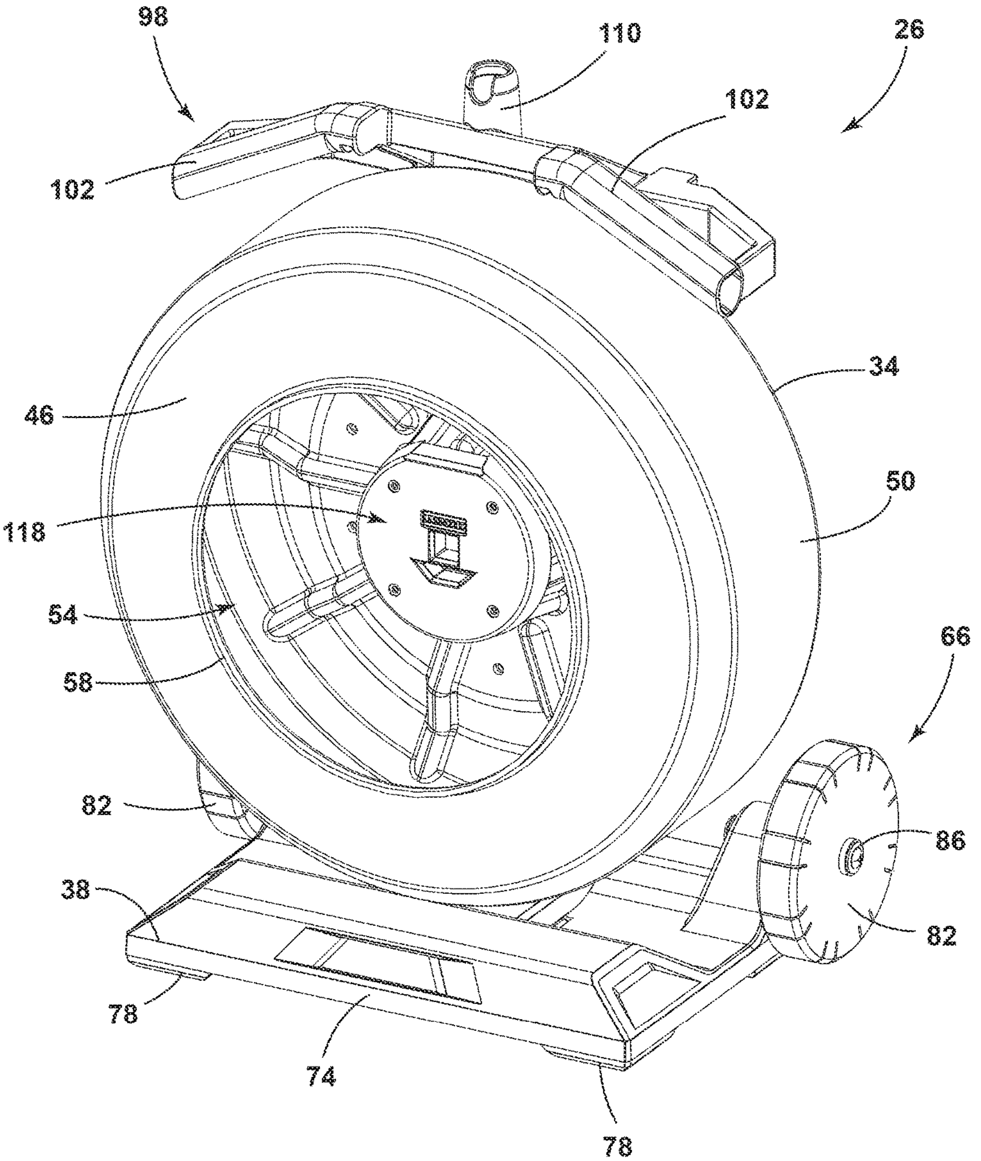
FIG. 1 is a front perspective view of a reel for use in a pipeline inspection device according to a first embodiment.
Figure 2:
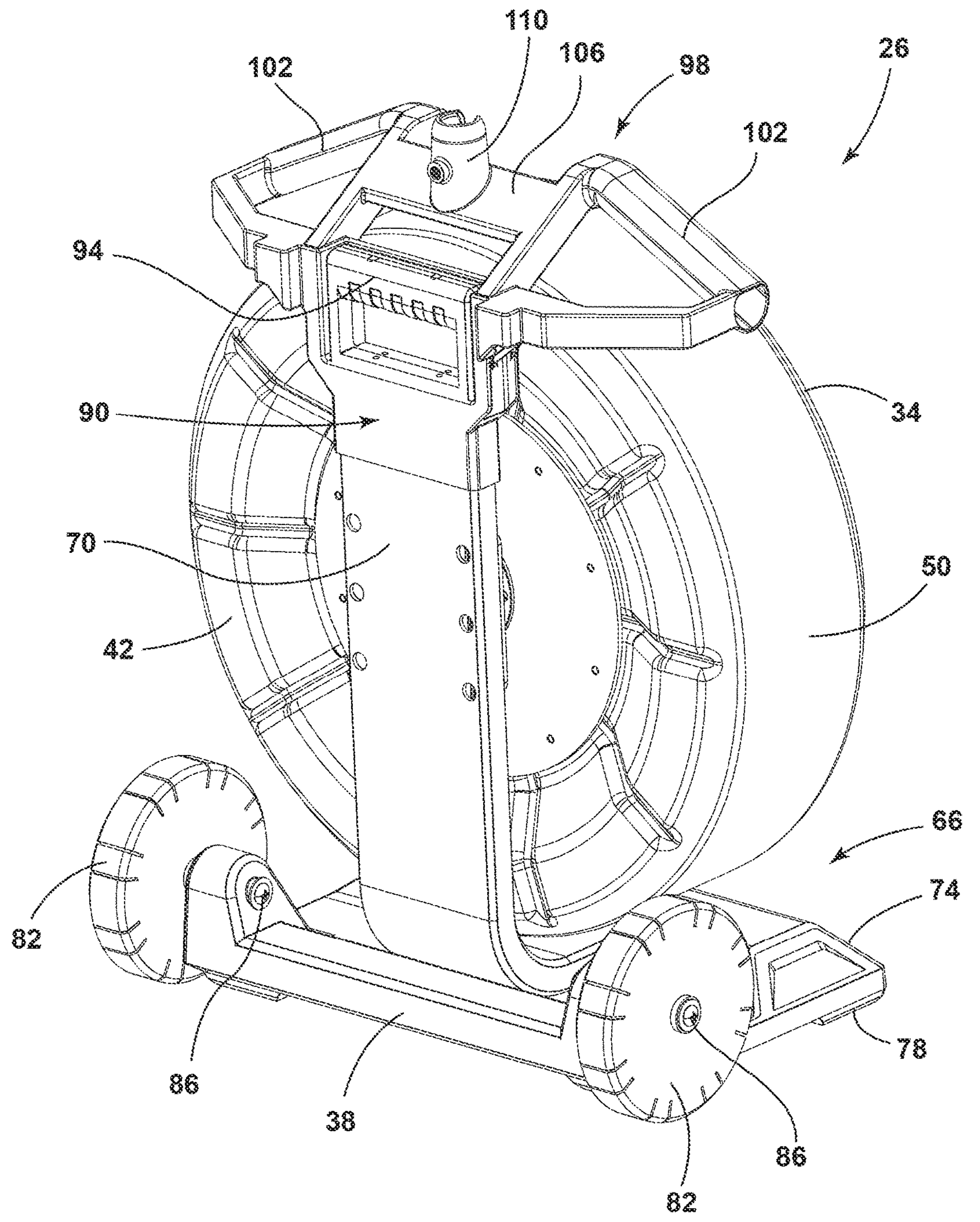
FIG. 2 is a rear perspective view of the reel illustrated in FIG. 1.
Figure 3:
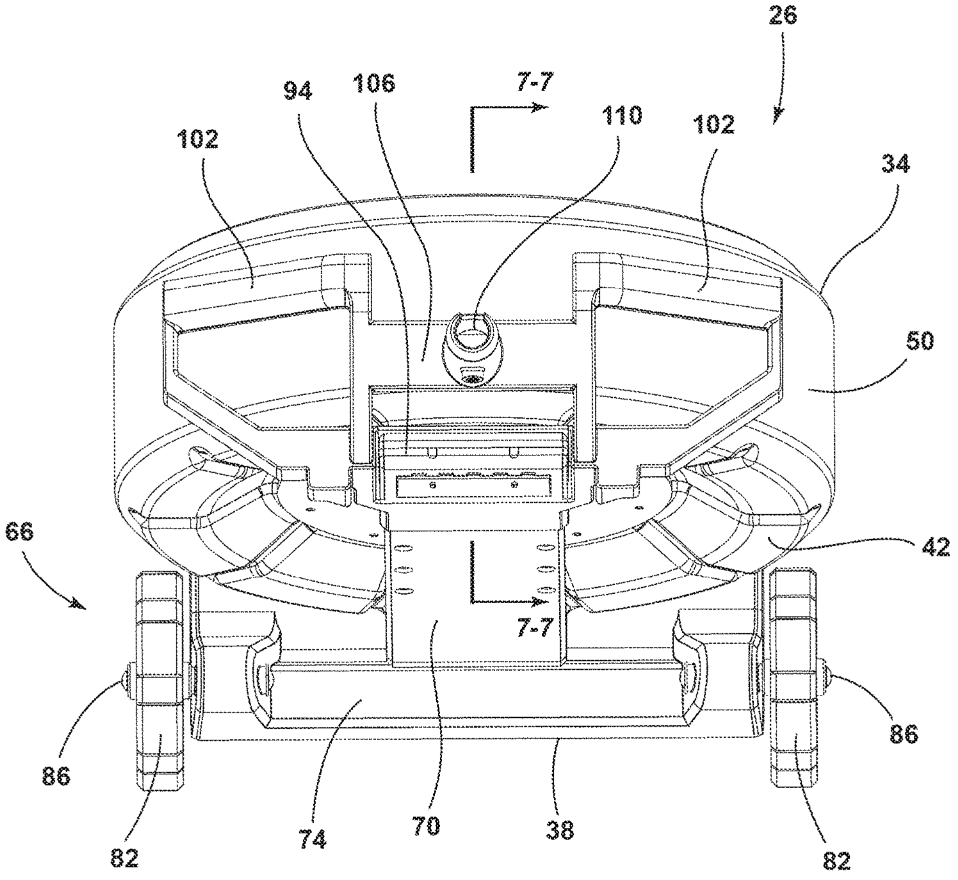
FIG. 3 is a top perspective view of the reel illustrated in FIG. 1.
Figure 4:
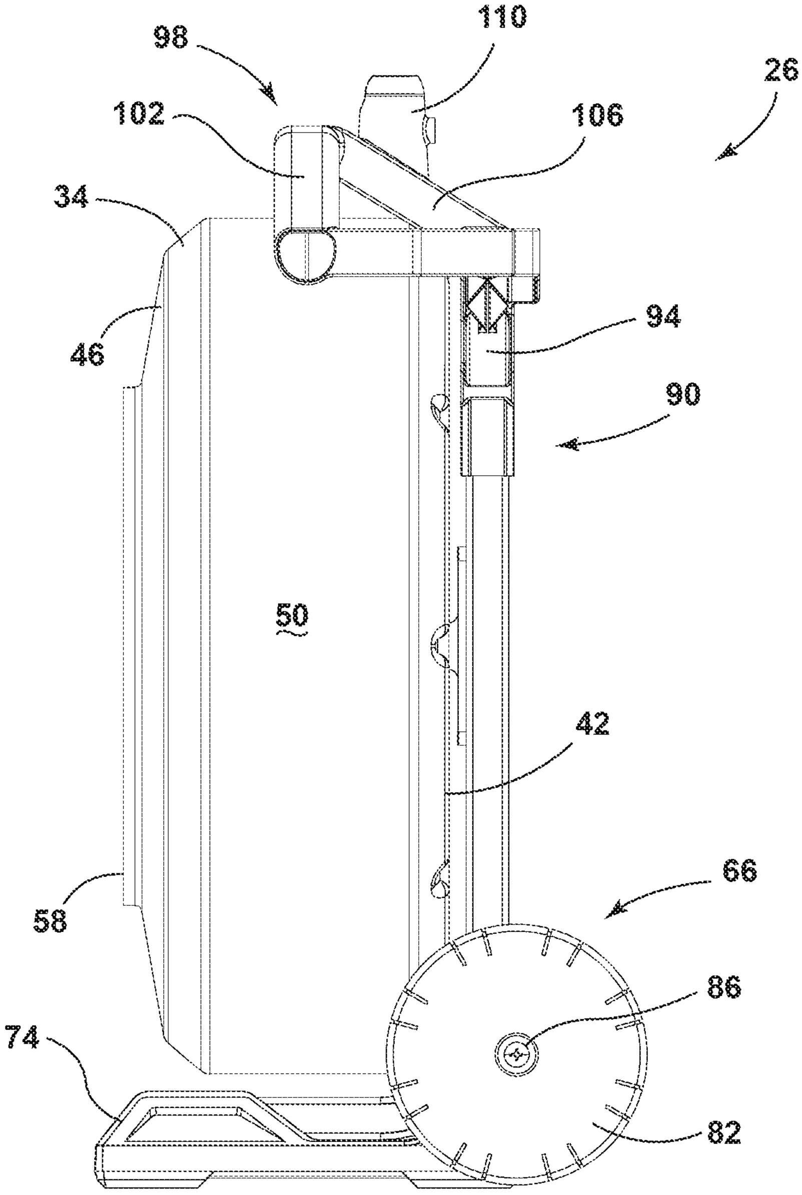
FIG. 4 is a side view of the reel illustrated in FIG. 1.

In the illustrated embodiment, the center support 70 also includes a second handle assembly 98 having two handle bars 102 extending outwardly from the center support 70. The second handle assembly 98 includes a frame 106 that supports the handle bars 102 above the drum 34. The second handle assembly 98 extends in a forward direction above the drum 34, with the handle bars 102 extending outwardly, towards respective wheels 82. Accordingly, the center support 70 includes the first handle assembly 90, which extends in a vertical direction (when oriented as shown in FIG. 2), and a second handle assembly 98, which extends in a horizontal direction (when oriented as shown in FIG. 2). However, in other embodiments, the second handle assembly 98 may be oriented in a different direction. For example, in some embodiment, the second handle assembly 98 may extend backwards, away from the drum 34.

The center support 70 also includes a mount 110 on the second handle assembly 98. The mount 110 can be used to support a monitor 114 (see, FIGS. 20-21), or other component of the pipeline assembly device. The mount 110 is supported on the frame 106 of the second handle assembly 98 in a position between the handle bars 102. In the illustrated embodiment, the mount 110 is a ball mount 110. The ball mount 110 creates a rotatable connection that allows the monitor 114 to be rotated in multiple directions. For example, the ball mount 110 allows for rotation in a swivel direction (e.g., left and right) and a tilt direction (i.e., up and down).

Figure 5:
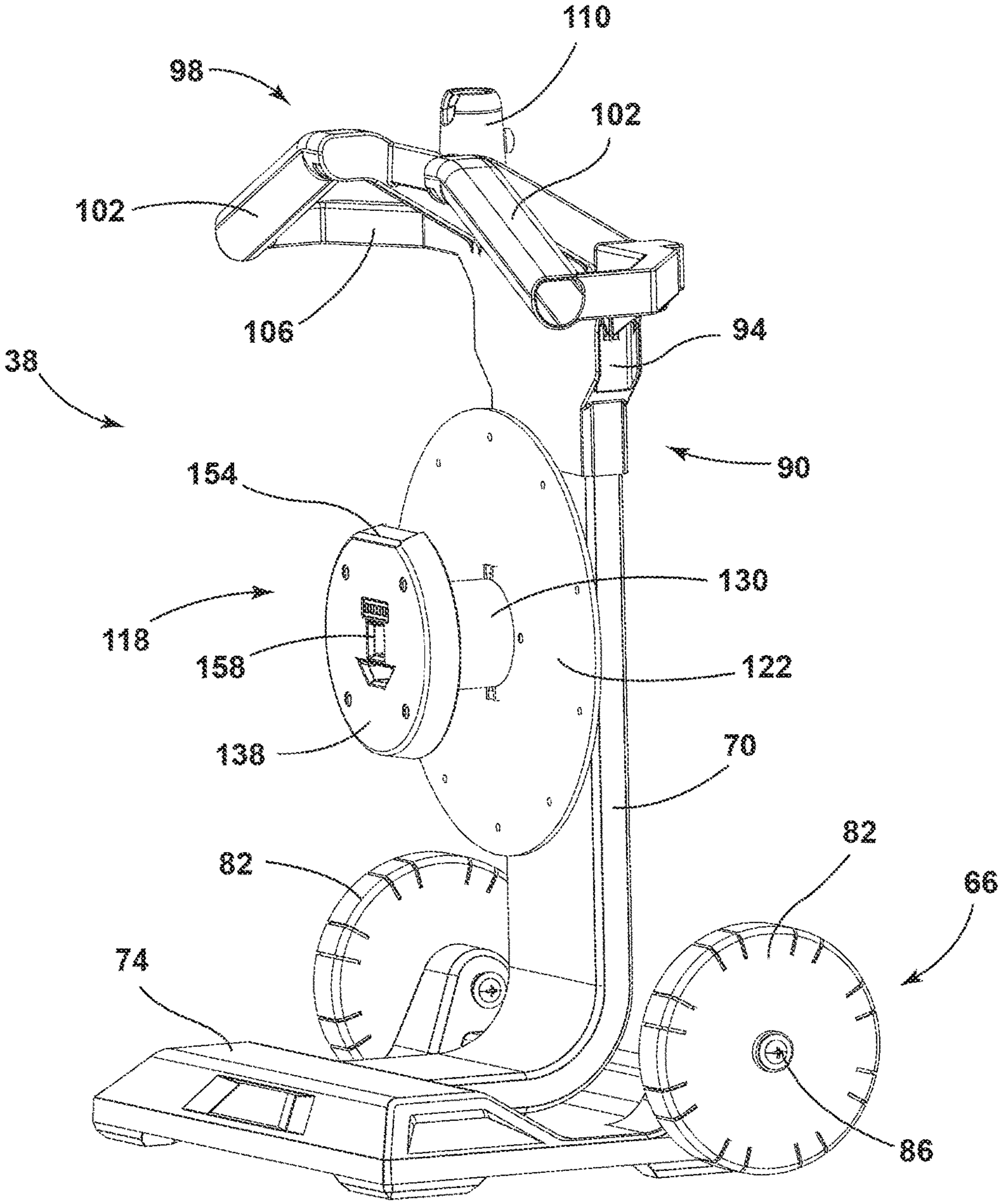
FIG. 5 illustrates the reel of FIG. 1 with a drum removed.
Figure 6:
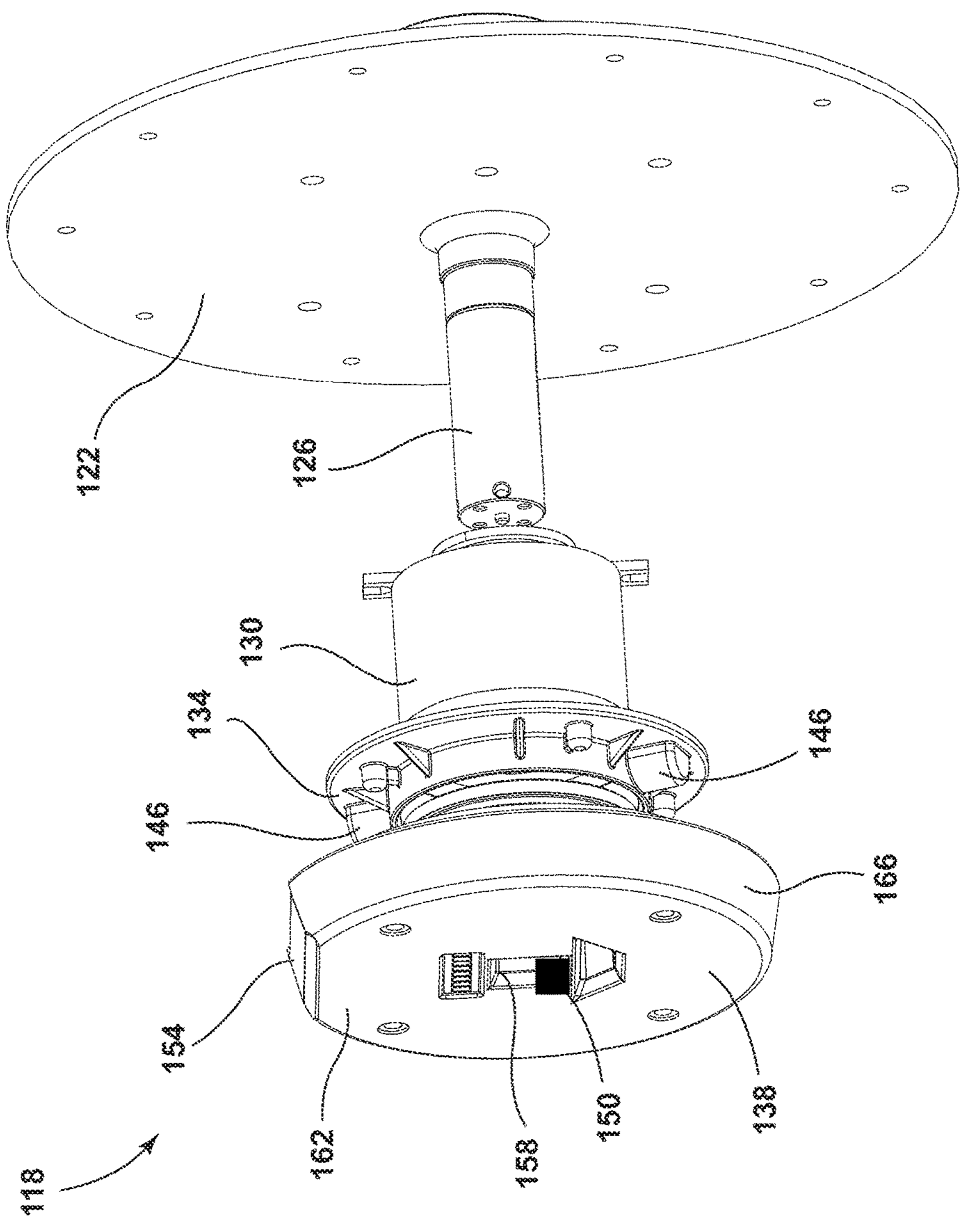
FIG. 6 illustrates a mounting assembly for use with the reel of FIG. 1.
Figure 7:
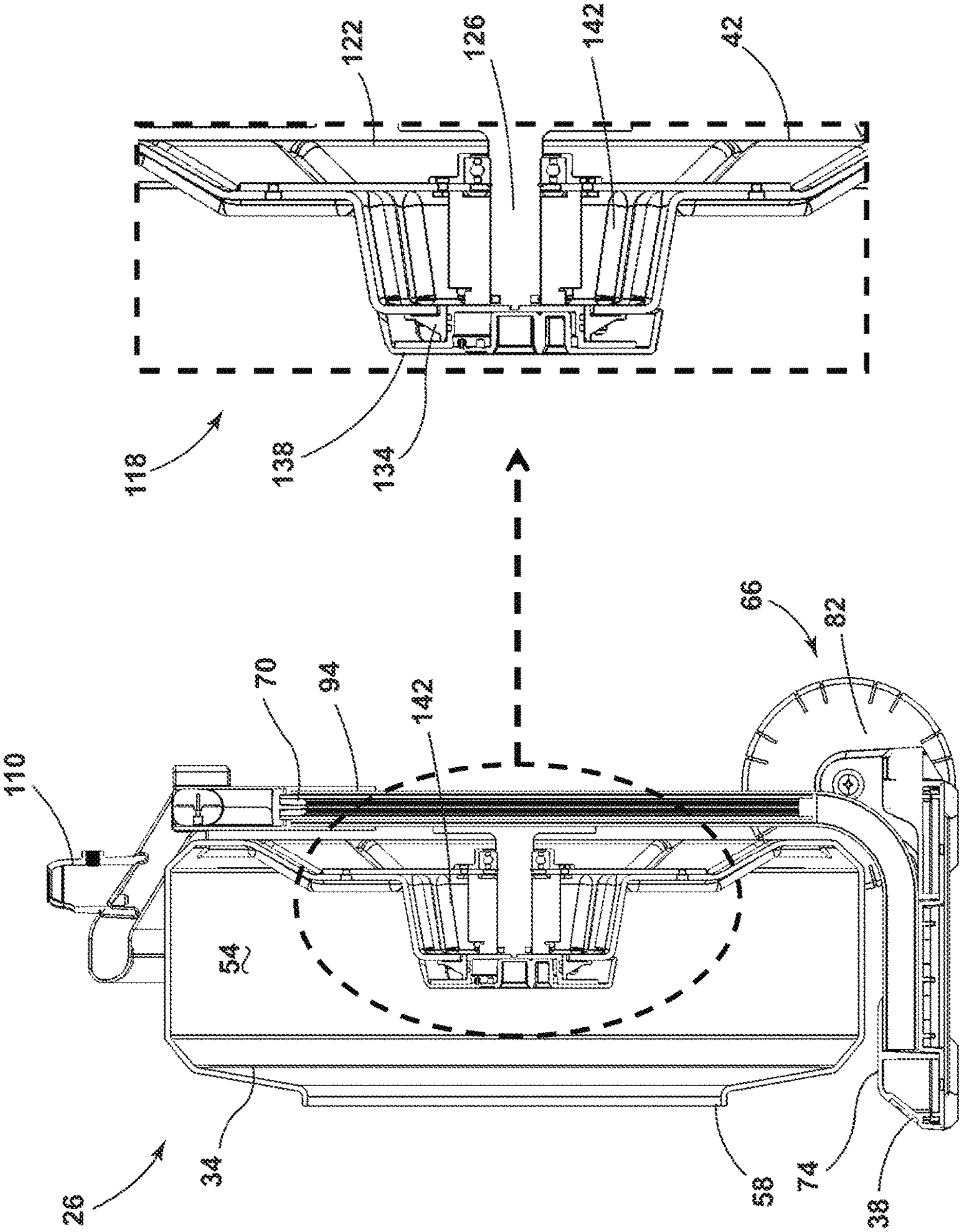
FIG. 7 is a cross-sectional view of the reel illustrated in FIG. 1 taken along section line 7-7 shown in FIG. 3.
Figure 8:
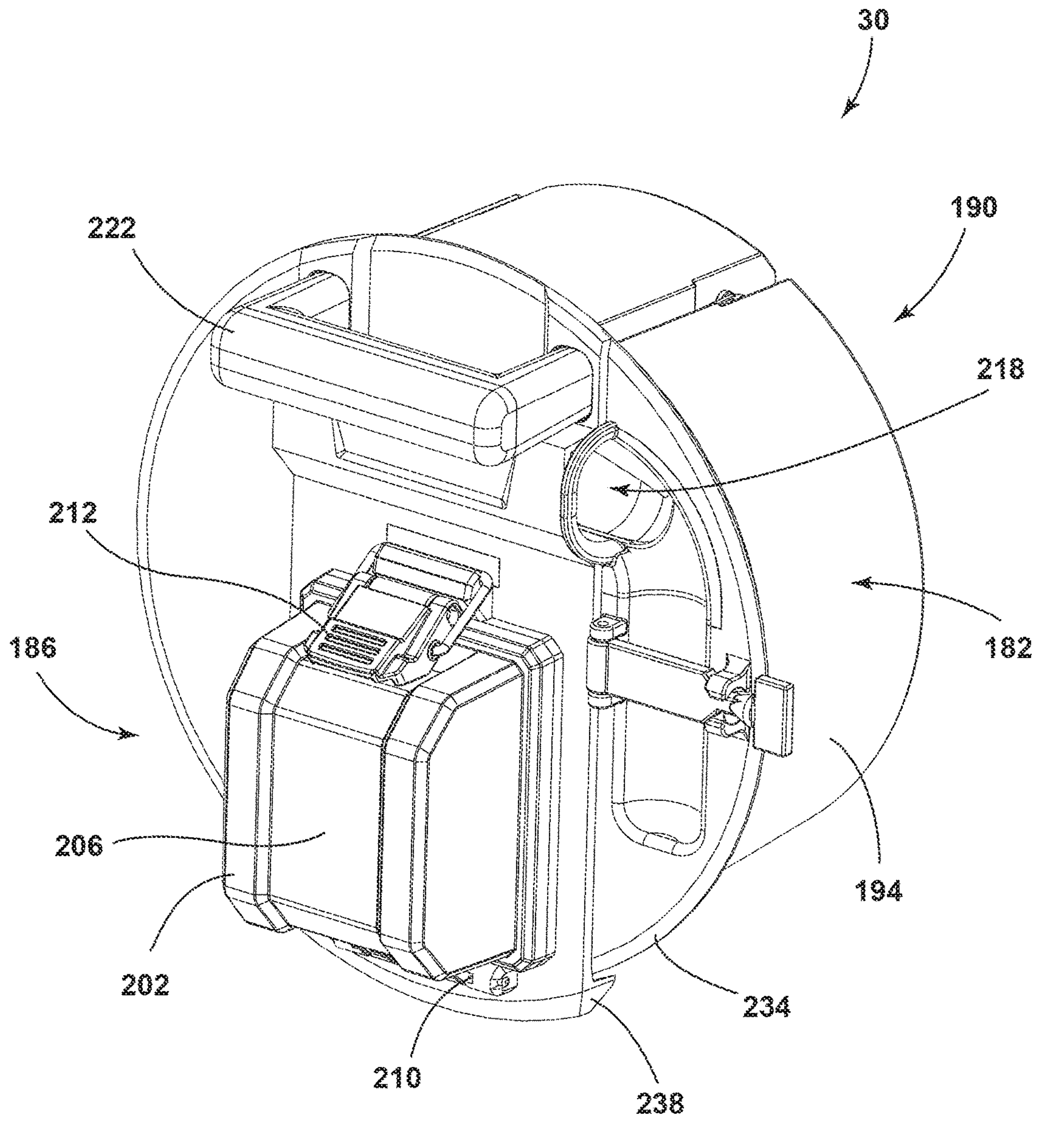
FIG. 8 is a front perspective view of a hub for use with a pipeline inspection device.
Figure 9:
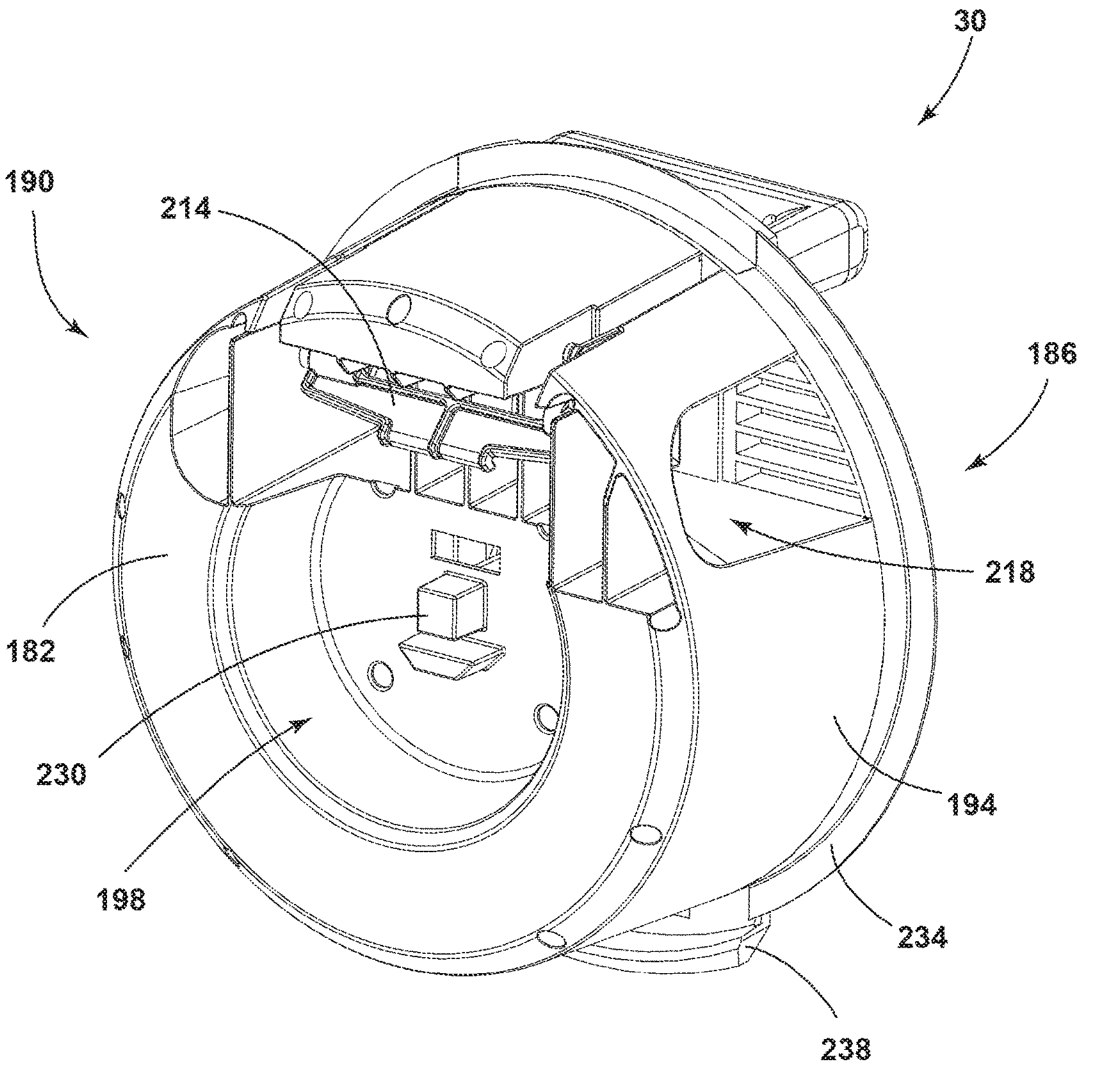
FIG. 9 is a rear perspective view of the hub illustrated in FIG. 8.
Figure 10:
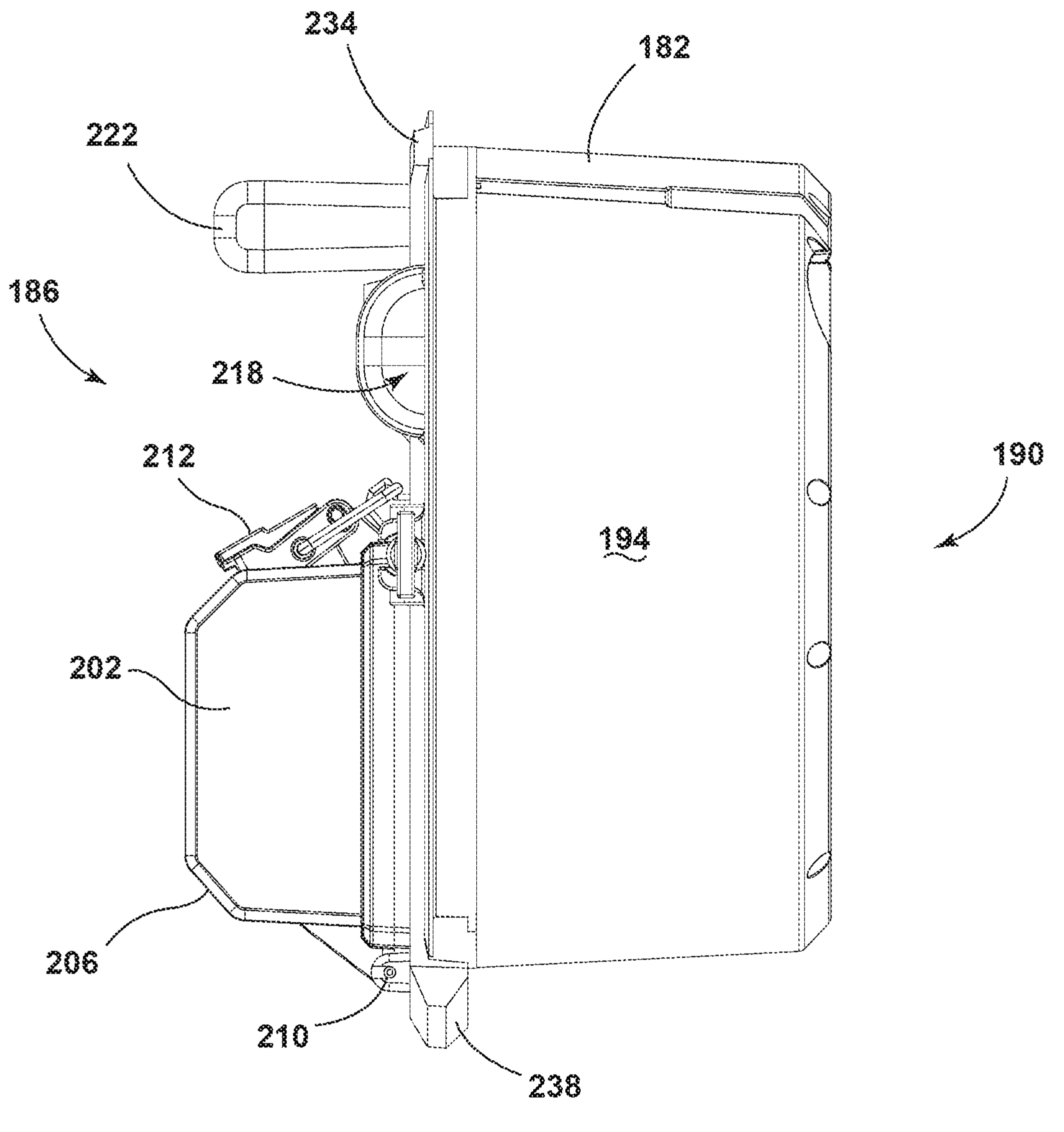
FIG. 10 is a first side view of the hub illustrated in FIG. 8.
Figure 11:
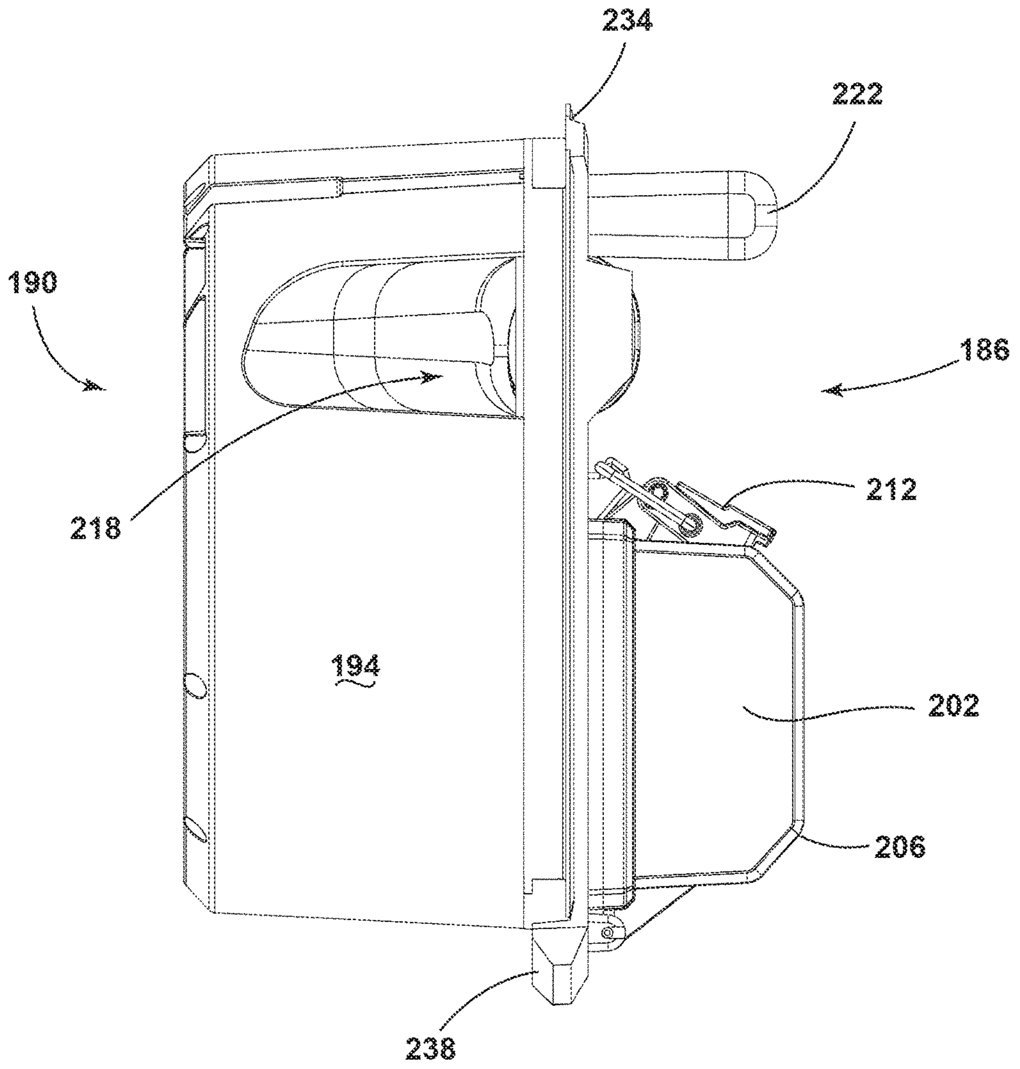
FIG. 11 is a second side view of the hub illustrated in FIG. 8.
Figure 12:
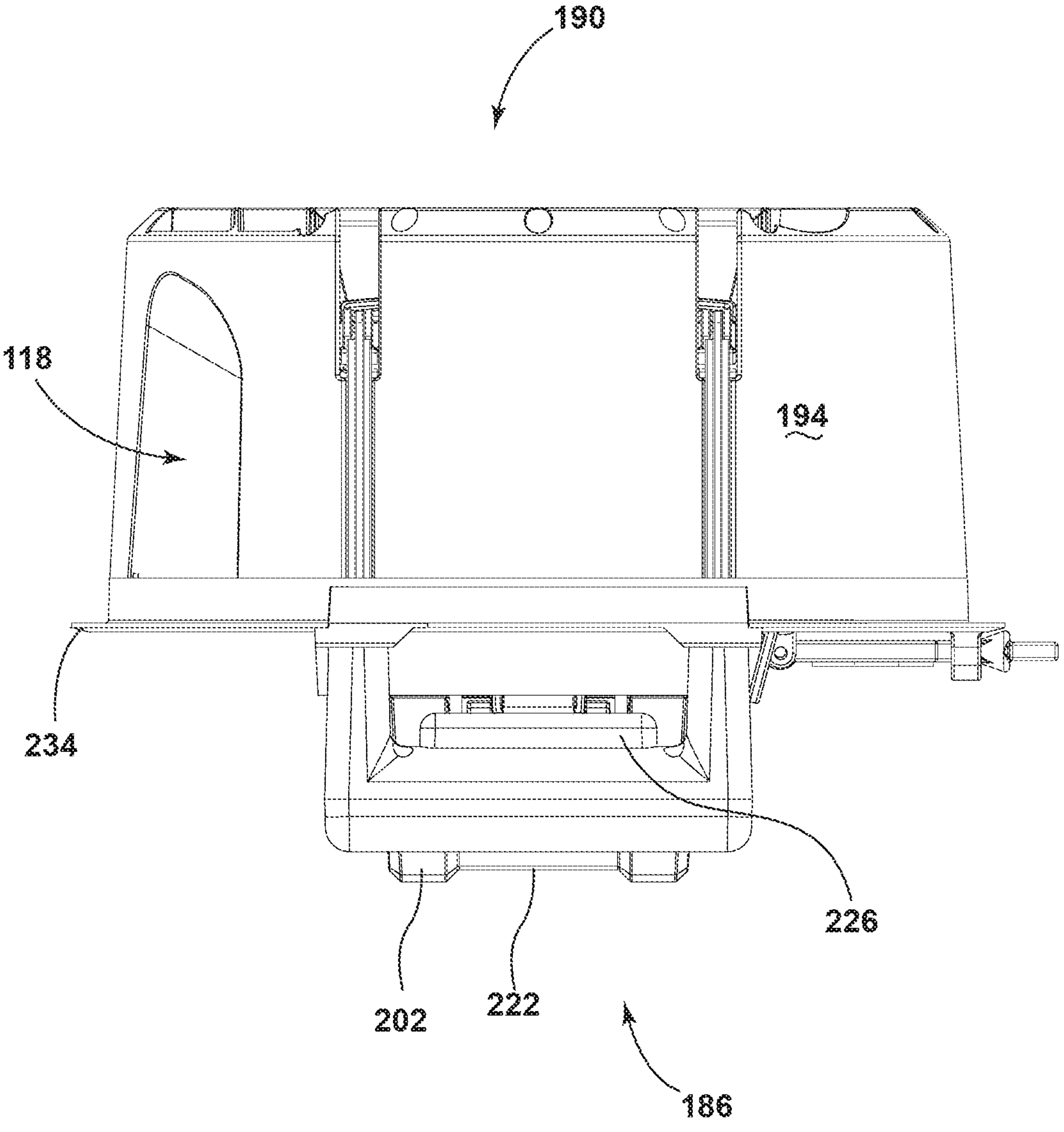
FIG. 12 is a top view of the hub illustrated in FIG. 8.

With references to FIGS. 5-7, the drum 34 is supported on the stand 38 by a mounting assembly 118. The mounting assembly 118 includes a rotatable portion and a fixed portion. The drum 34 is mounted on the rotatable portion of the mounting assembly 118, while the hub 30 is mounted to the reel 26 via the fixed portion of the mounting assembly 118. The mounting assembly 118 includes a mounting plate 122, a shaft 126, a slip ring 130, a disk 134, and a core 138. The mounting plate 122, (a portion of) the slip ring 130, and the disk 134 are rotatably fixed relative to one another, and thus, rotate together with the drum 34. Thus, the rotatable portion of the mounting assembly 118 includes the mounting plate 122, the slip ring 130, and the disk 134. In other words, the drum 34, the mounting plate 122, the slip ring 130, and the disk 134 rotate together relative to the stand 38. The shaft 126 and the core 138, on the other hand are rotatably fixed relative to one another and relative to the stand 38. The fixed portion of the mounting assembly 118 includes the shaft 126 and the core 138.

The shaft 126 is coupled to the center support 70 of the stand 38. The shaft 126 provides a cantilevered support for the drum 34 above the platform 74 of the stand 38. Specifically, the shaft 126 engages and supports the drum 34 only via the back wall 42. Because the drum 34 includes the opening 58 in the front wall 46, the shaft 126 does not extend through the entire width of the drum 34 or engage the front wall 46. This creates a cantilever effect whereby the drum 34 is cantilevered over the platform 74 by the engagement of the shaft 126 with the back wall 42 of the drum 34. This cantilevered design enables the front wall 46 of the drum 34 to include the opening 58 for inserting the hub 30 into the interior 54 of the drum 34.

The mounting plate 122 is fixed to the back wall 42 of the drum 34. In some embodiments, the mounting plate 122 is integral with the back wall 42 of the drum 34. The slip ring 130 is disposed within a space 142 (FIG. 7) formed by the back wall 42 of the drum 34. The slip ring 130 allows for transmission of electrical signals, while allowing the drum 34 to rotate relative to the reel 26. The mounting plate 122 and the slip ring 130 rotatably support the drum 34 on the shaft 126. Specifically, the shaft 126 extends at least partially through the mounting plate 122 and the slip ring 130, which allow the drum 34 to rotate about the shaft 126.

The disk 134 also rotates with the drum 34. The disk 134 includes magnets 146 that rotate with the disk 134 and the drum 34 as the cable 14 is unwound from the drum 34. The magnets 146 are used in conjunction with a sensor 150 (FIG. 6) on the hub 30 to measure how much cable 14 has been unwound. Specifically, as the drum 34 rotates, the magnets 146 rotate about the axis of the drum 34. The sensor 150 (e.g., a Hall sensor) is located on the stationary hub 30 along the axis. As the magnets 146 rotate, the sensor 150 can monitor 114 the movement of the magnets 146 to determine how much cable 14 has been extended from the drum 34.

The core 138 is coupled to a distal end of the shaft 126. The core 138 does not rotate with the drum 34, but rather, is fixed relative to the shaft 126 and the stand 38. The core 138 supports the hub 30 when the hub 30 is inserted into the interior 54 of the drum 34 via the opening 58 on the front wall 46. The core 138 includes and engagement surface 154 that enables the hub 30 to be removably coupled to the reel 26. The core 138 also includes electrical connections that engage with electrical connections on the hub 30. In addition, the core 138 includes at least one recess 158 that aligns and engages with a portion of the hub 30. The recesses 158 help secure the hub 30 to the reel 26 and maintain a slide electrical connection between the two.

In the illustrated embodiment, the core 138 has a circular face 162 with an annular lip 166 extending around the perimeter of the face 162. The engagement surface 154 is formed along the lip 166 on a top side of the core 138. Specifically, the engagement surface 154 is formed by a flattened portion of the annular lip 166. The hub 30 can grip the core 138 along the flattened portion of the lip 166. In other embodiments, the core 138 can be different shapes that are suitable to provide an engagement surface 154 for coupling to the hub 30.

Referring to FIG. 23, the hub 30 includes a power source and other electrical components for operating the pipeline inspection device 10. For example, the hub 30 may include a video processor 170, a battery 174, a wireless communication module 178 (e.g., a Wi-Fi hub, a Bluetooth module), etc. In other embodiments, the hub 30 may include more or fewer of these electrical components. For examples, in some embodiments, the hub 30 does not include a wireless communication module 178, but rather, includes wired connections to the monitor 114 and other components. Similarly, in some embodiments, the hub 30 does not include a video processor 170. Instead, the video processor 170 may be integrated into the monitor 114.

Referring to FIGS. 8-12, the hub 30 includes a cylindrical body 182 that is received within the interior 54 of the drum 34. The cylindrical body 182 is defined by a front end 186, a rear end 190, and an outer wall 194 extending around the perimeter of the hub 30 between the front end 186 and the rear end 190. The rear end 190 of the hub 30 has a cavity 198 that includes various mating members that engage with the core 138 of the reel 26. The mating members secure the hub 30 to the reel 26 and help align the hub 30 and maintain a solid connection between the hub 30 and the reel 26. These mating members will be described in greater detail below.

The cylindrical body 182 defines a housing for maintaining the electrical components of the pipeline inspection device 10. In some embodiments, the body 182 is air and/or water tight in order to protect the electrical components. In the illustrated embodiment, the front end 186 of the hub 30 includes a battery housing 202 for receiving a battery 174. The battery 174 is removable from the battery housing 202 of the hub 30. The battery housing 202 includes a cover 206 that can be opened and closed to insert and remove the battery 174, respectively. The cover 206 forms an air and/or water tight seal to protect the battery 174 and other electrical components. The cover 206 is attached to the front end 186 by a hinge 210 and a latch 212. The hub 30 also includes a channel 218 extending through the cylindrical body 182 from the outer wall 194 to the front end 186. When the hub 30 is inserted in the drum 34, the channel 218 receives the cable 14 and helps guide the cable 14 into or out of the drum 34. In addition, the hub 30 may include a holding mechanism configured to hold the camera 18 during storage such that the cable 14 is prevented from spooling out and the camera 18 is prevented from falling into the hub 30.

In addition, the hub 30 includes a handle 222 provided on the front end 186 of the hub 30. The handle 222 extends outwardly from the front end 186 of the hub 30 and can be used to maneuver the hub 30 into the opening 58 of the drum 34. The handle 222 includes a trigger 226 (FIG. 12) that activates a latch 214 on the rear end 190 of the cylindrical body 182. The latch 214 is one of the mating members disposed within the cavity 198 of the hub 30. The latch 214 is configured to engage with the engagement surface 154 on the core 138 of the mounting assembly 118 of the reel 26. Pressing the trigger 226 rotates the latch 214 from a locked position to an unlocked position. In the illustrated embodiment, pressing the trigger 226 rotates the latch 214 upward into the unlocked position. The latch 214 is biased towards the locked position such that releasing the trigger 226 causes the latch 214 to rotate downward and into the locked position.

The hub 30 also includes various other matting members that help align and support the hub 30 within the drum 34. The cavity 198 of the hub 30 includes at least one protrusion 230 that is shaped to align with the recesses 158 on the core 138 of the mounting assembly 118. For example, the hub 30 includes a square protrusion 230 that is received within the square recess 158 on the face 162 of the core 138. The protrusion 230 defines a pocket that receives the sensor 150 for monitoring movement of the magnets 146 to help determined the amount 110 of cable 14 that has been extended from the drum 34. In some embodiments, the core 138 and the hub 30 may include more or fewer recesses 158 and protrusion 230*s*, respectively, to help align the hub 30 with the drum 34. In the illustrated embodiment, the hub 30 also includes a rim 234 that extends around the perimeter of the cylindrical body 182 for mating with the opening 58 of the drum 34. When the hub 30 is received within the drum 34, the rim 234 engages with the edge of the opening 58 to help align the hub 30 relative to the drum 34. In the illustrated embodiment, the rim 234 further includes a hook 238 to help grip the edge of the opening 58 in the drum 34. In the illustrated embodiment, the hook 238 is arcuate and extends along a bottom edge of the rim 234.

As previously mentioned, the hub 30 is removable from the drum 34 and may be attached to two different sized reels 26. Pipes typically come in two different sizes: a 1.5 to 3 inch diameter pipe and a 3 to 6 inch diameter pipe. Each of the two types of pipes requires a different diameter camera and cable. The smaller pipe (i.e., 1.5 to 3 inch pipe) requires a smaller diameter camera and cable that is more flexible, while the larger pipe requires a larger diameter camera and cable. Each of the smaller diameter camera and cable and the larger diameter camera and cable requires a corresponding large or small sized reel and cable drum, which are part of correspondingly sized pipeline inspection devices. In the illustrated embodiment, the hub 30 may be removably detached and interchangeably attached to each of the drums of the different sized pipeline inspection devices, such that a user only needs a single hub 30 containing the electronics (e.g., the video processor 170, the battery 174, the wireless communication module 178 (Wi-Fi hub), etc.) that can be used with either of the reels 26.

FIGS. 13-18 provide another embodiment of a reel 26*a* that can be used with the hub 30. The reel 26*a* illustrated in FIGS. 13-18 is smaller than the reel 26 illustrated in FIGS. 1-6. In the embodiment illustrated in FIGS. 13-18, the reel 26*a* is a more compact size to improve transportability. For example, in the illustrated embodiment, the reel 26*a* can be carried as a backpack. The reel 26*a* includes a drum 34*a* supported by a stand 38*a*. The drum 34*a* includes an open front wall 46*a* defining an opening 58*a* for receiving the hub 30 and a closed back wall 42*a* for mounting to the stand 38*a*. The stand 38*a* includes a platform 74*a* and a center support 70*a* extending upwardly from the platform 74*a*. A backpack plate 242 is removably coupled to the center support 70*a*. The backpack plate 242 can include backpack straps that enable a user to carry the reel 26*a* on his/her back. If desired, the backpack portion of the reel 26*a* (i.e., the backpack plate 242 and straps) can be removed from the reel 26*a*.

Figure 20:
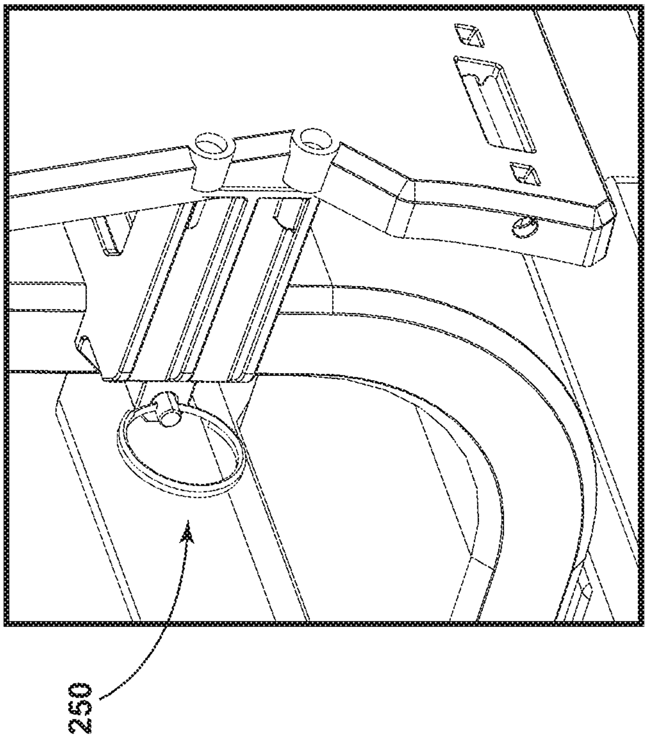
FIG. 20 is a detailed view of a locking pin 250.

The backpack plate 242 is removably coupled to the stand 38*a* by a slot and locking pin 250 (FIG. 20). The top portion of the backpack plate 242 includes a slot 236 for receiving a hook 238 disposed on center support 70*a*. The bottom portion of the backpack plate 242 includes the locking pin 250. The locking pin 250 includes pin holes in the backpack plate 242 and the center support 70*a*, and a pin that extends through both holes. To remove the backpack plate 242, the pin is removed from the holes to release the backpack plate 242.

Figure 13:
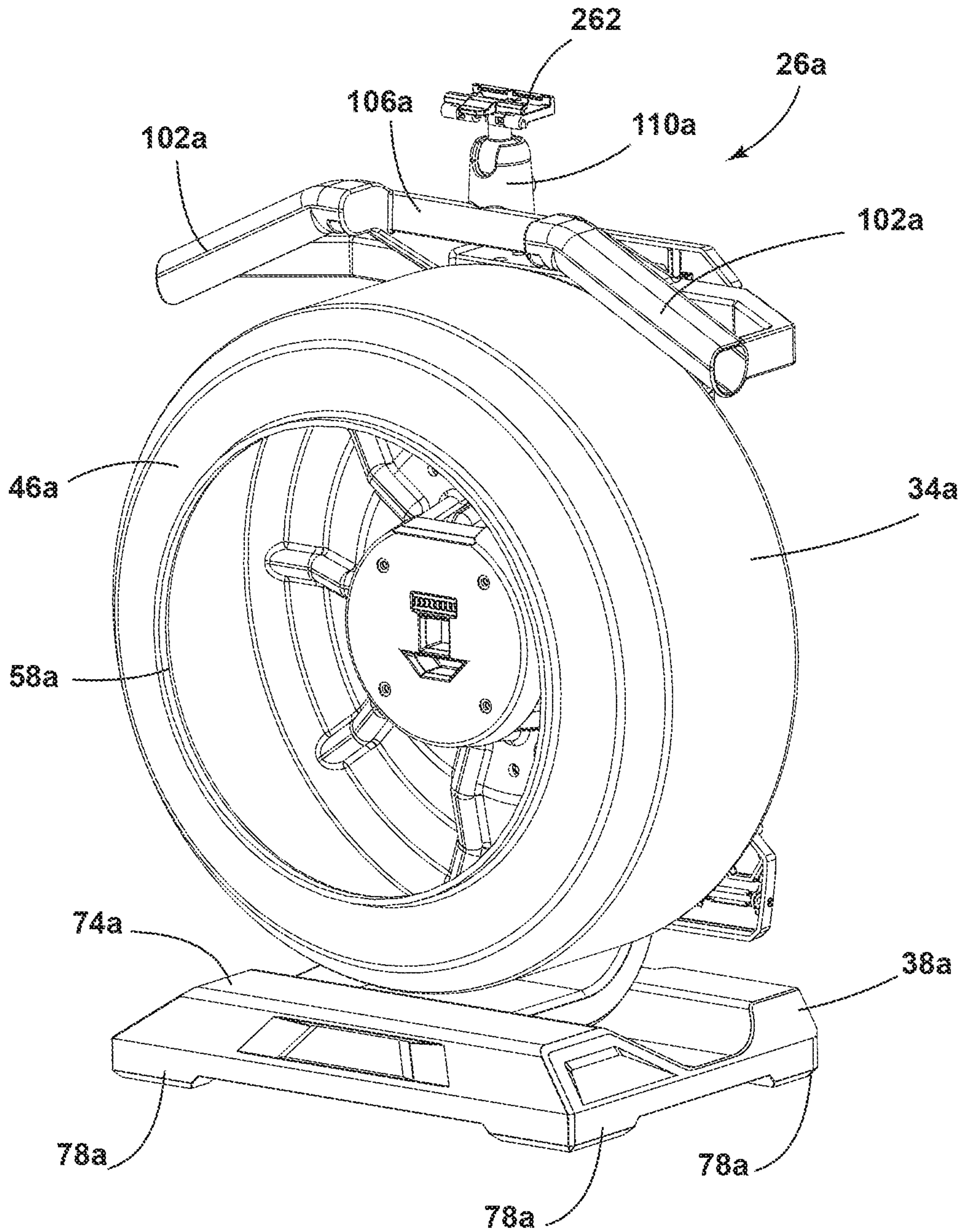
FIG. 13 is a front perspective view of a reel for use in a pipeline inspection device according to a second embodiment.
Figure 14:
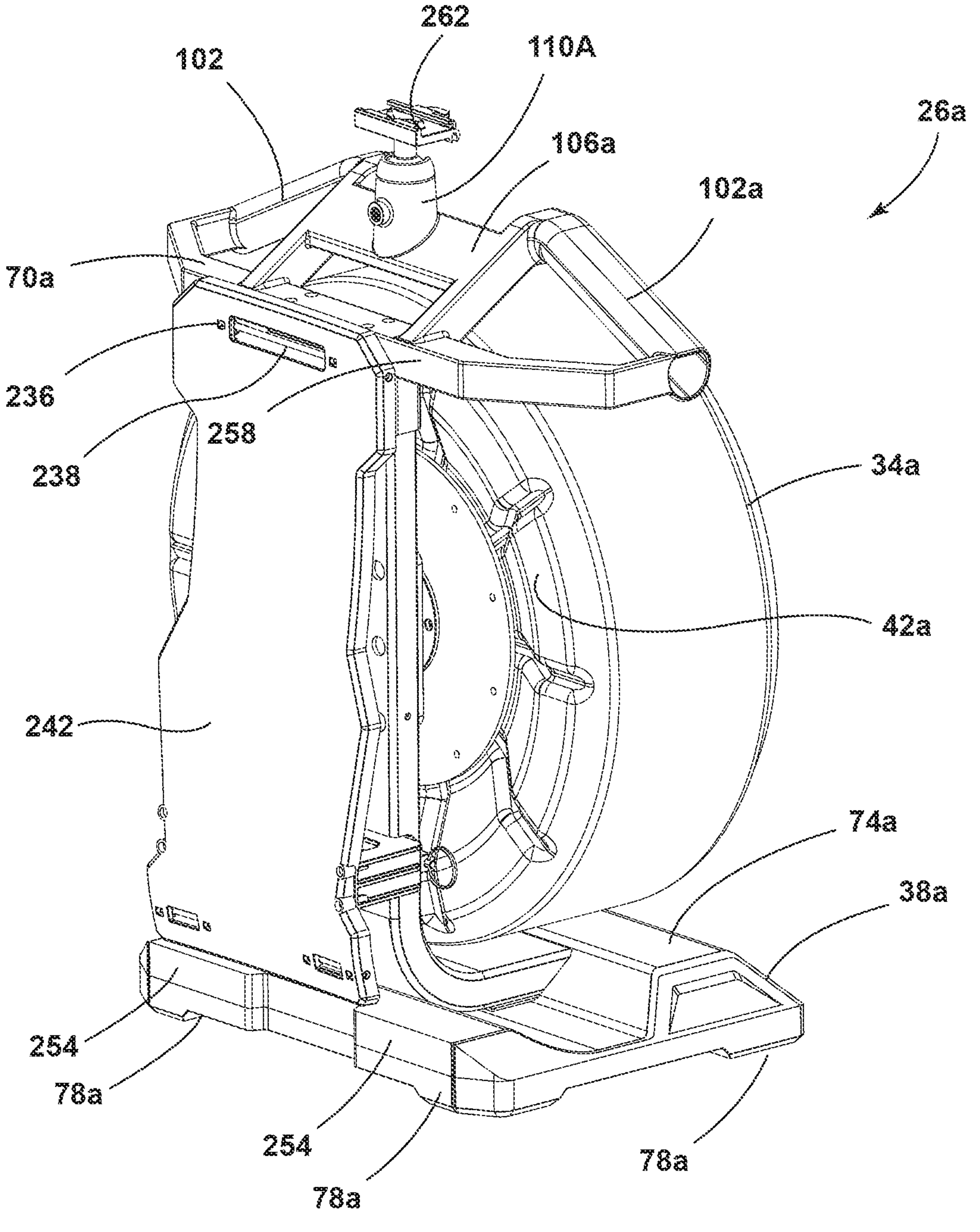
FIG. 14 is a rear perspective view of the reel illustrated in FIG. 13.
Figure 15:
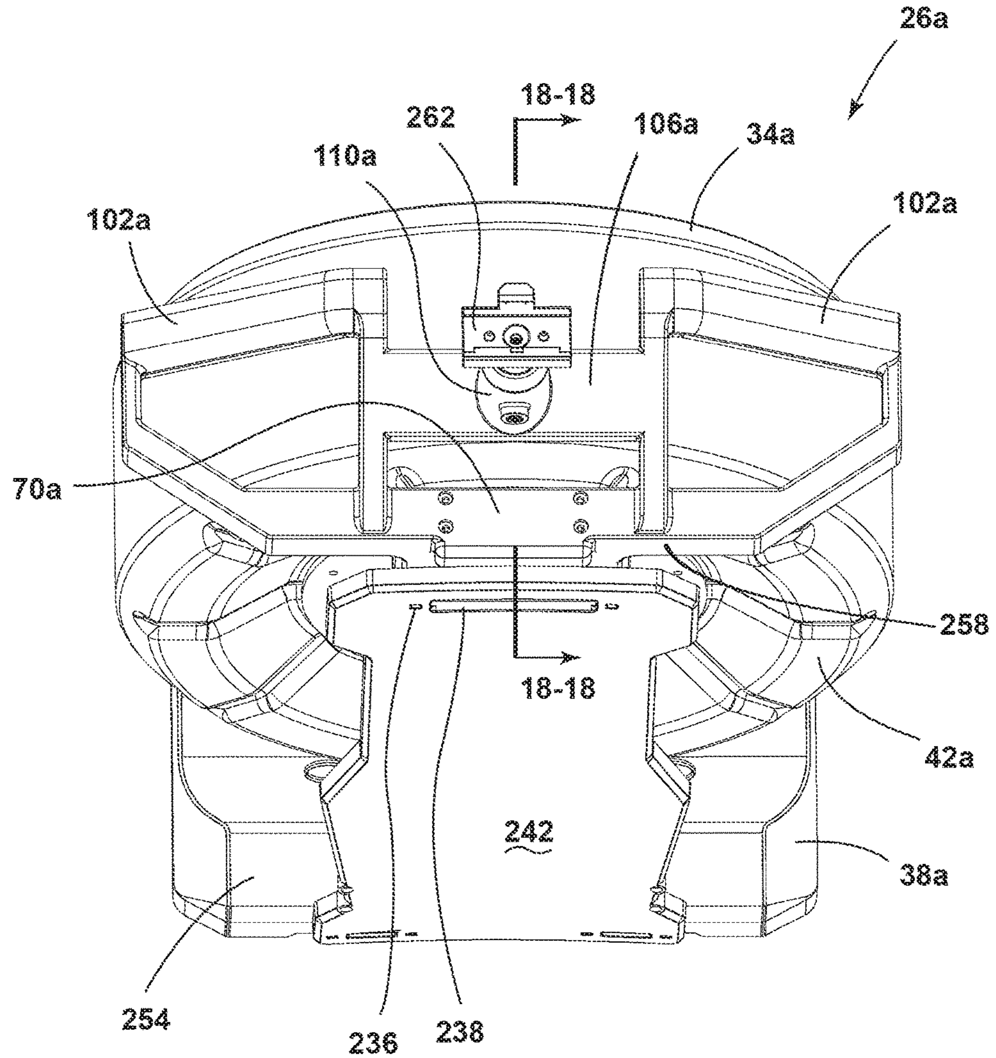
FIG. 15 is a top perspective view of the reel illustrated in FIG. 13.
Figure 16:
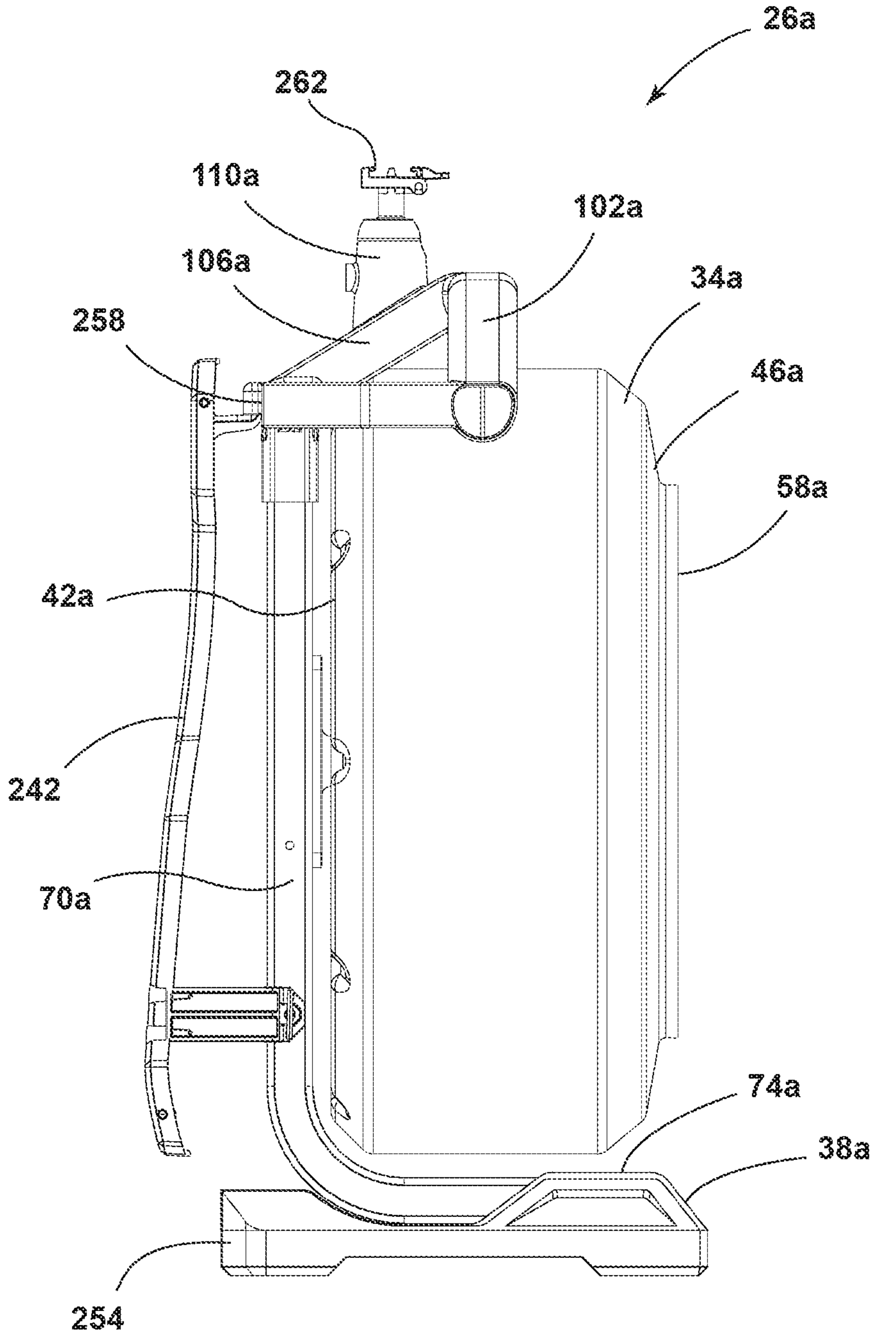
FIG. 16 is a side view of the reel illustrated in FIG. 13.
Figure 17:
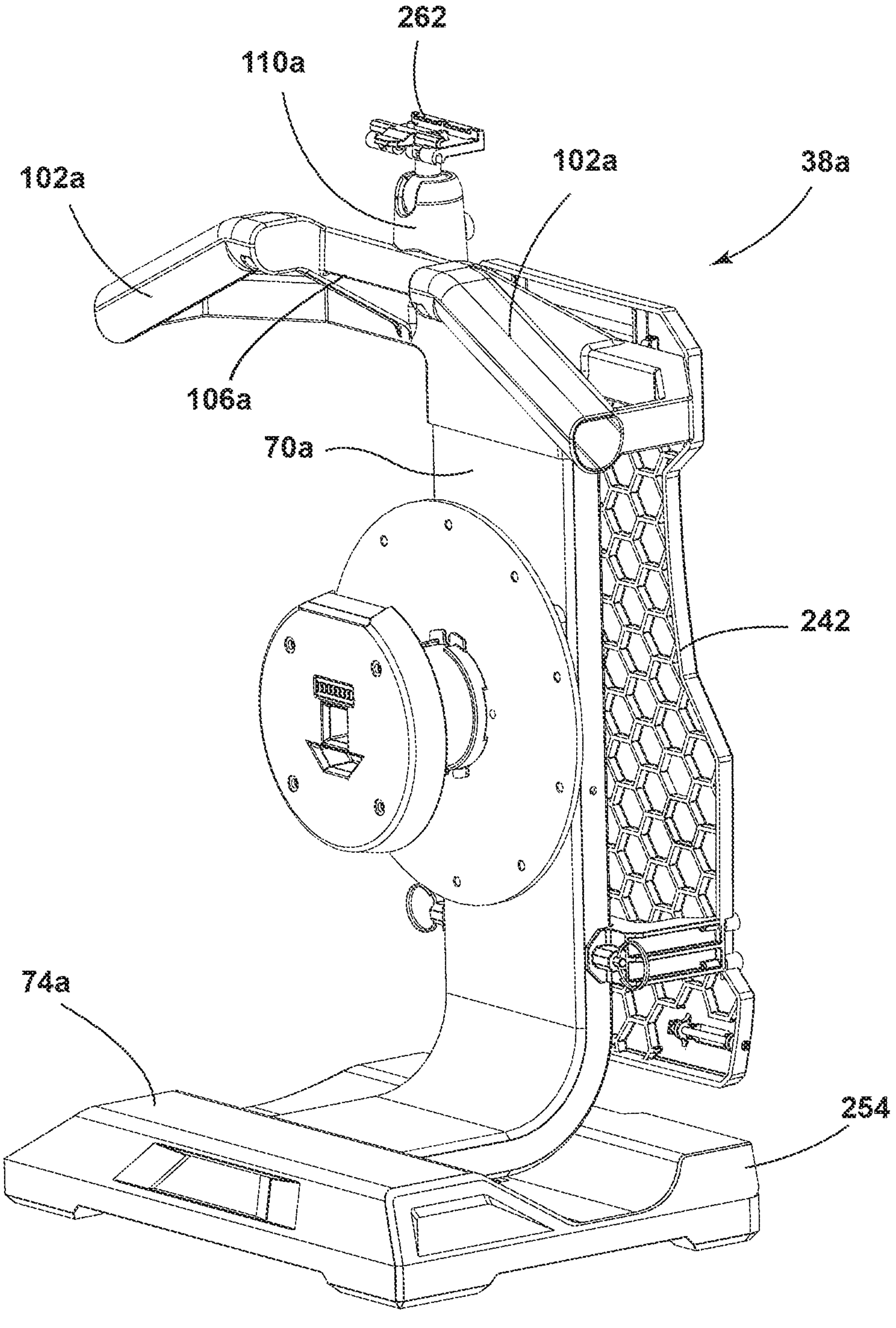
FIG. 17 illustrates the reel of FIG. 13 with a drum removed.
Figure 18:
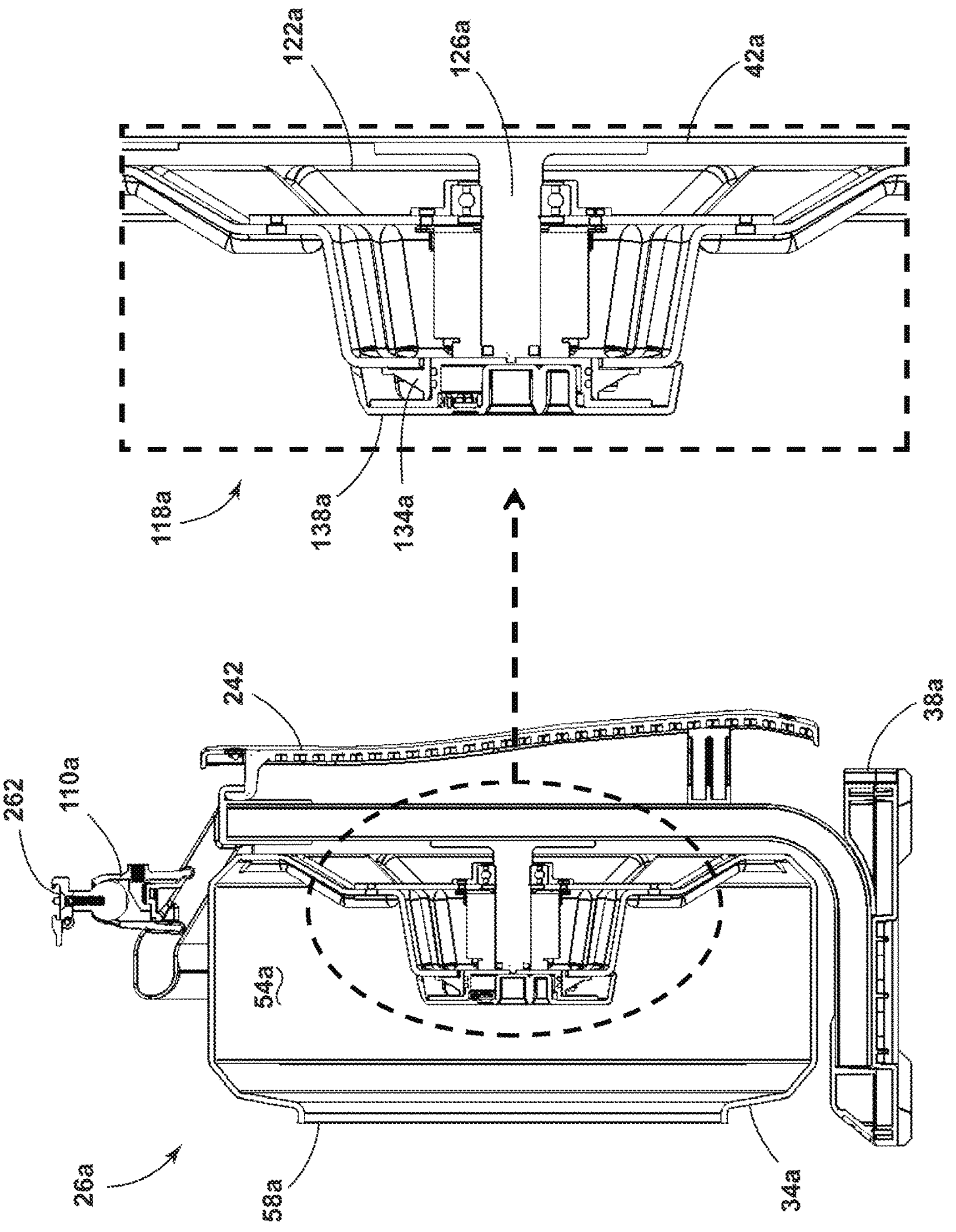
FIG. 18 is a cross-sectional view of the reel illustrated in FIG. 13 taken along section line 18-18 shown in FIG. 15.

The reel 26*a* is configured to be operated in either a vertical orientation or a horizontal orientation. The stand 38*a* includes feet 78*a* along a bottom surface of the platform 74*a* for supporting the reel 26*a* in an upright (i.e., vertical) position, as shown in FIG. 13. The stand 38*a* can also be oriented in a horizontal position by laying the reel 26*a* on the center support 70*a* with the backpack plate 242 removed. The stand 38*a* includes a first surface 254 along a bottom of the stand 38*a* and a second surface 258 along the top of the stand 38*a* that can support the reel 26*a* in a horizontal orientation. Specifically, the first surface 254 extends along a back edge of the platform 74*a*, and the second surface 258 extends along a back edge of the center support 70*a*. Together, the first surface 254 and the second surface 258 form a second set of feet 78*a* for supporting the reel 26*a* in a horizontal orientation.

In addition, the reel 26*a* includes a handle assembly supported by the center support 70*a*. Specifically, the center support 70*a* includes a handle assembly having two handle bars 102*a* extending in outwardly from the center support 70*a*. The handle assembly includes a frame 106*a* that supports the handle bars 102*a* above the drum 34*a*. The handle assembly extends in a forward direction above the drum 34*a*, with the handle bars 102*a* extending outwardly.

Figure 19:
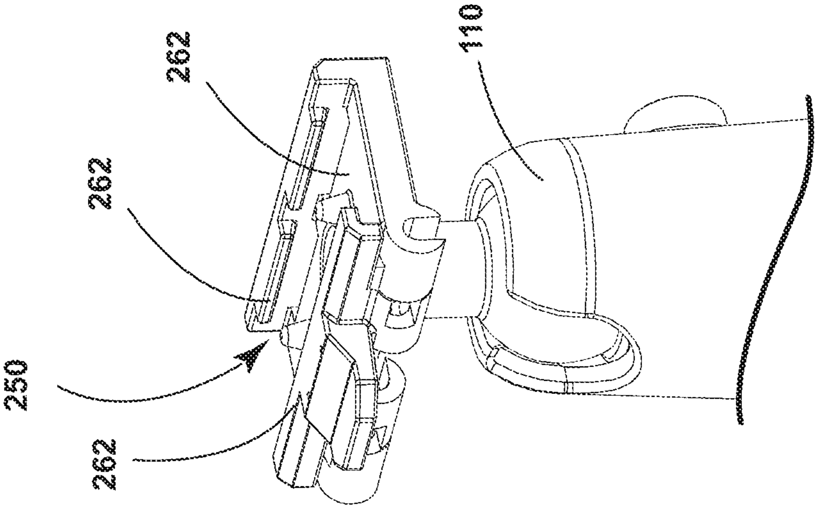
FIG. 19 is a detailed view of a ball mount.

The center support 70*a* also includes a mount 110*a* on the handle assembly. The mount 110*a* can be used to support the monitor 114 (see, FIGS. 21-22), or other component of the pipeline assembly device. The mount 110*a* is supported on the frame 106*a* of the handle assembly in a position between the handle bars 102*a*. In the illustrated embodiment, the mount 110*a* is a ball mount 110*a* that is capable of rotating in two directions. For example, the ball mount 110*a* allows for rotation in a swivel direction (e.g., left and right) and a tilt direction (i.e., up and down). In this embodiment, that ball mount 110*a* includes a clip 262, shown in FIG. 19, which allows for a quick attachment/detachment of the monitor 114*a* or other component. For example, the clip 262 can include a snap fit connection, a slide connection, a detent connection, or the like. The clip 262 includes a set of rails 260 that form a channel 264. This allows components, such as the monitor 114, to be slidably received within the channel 264.

Figure 21:
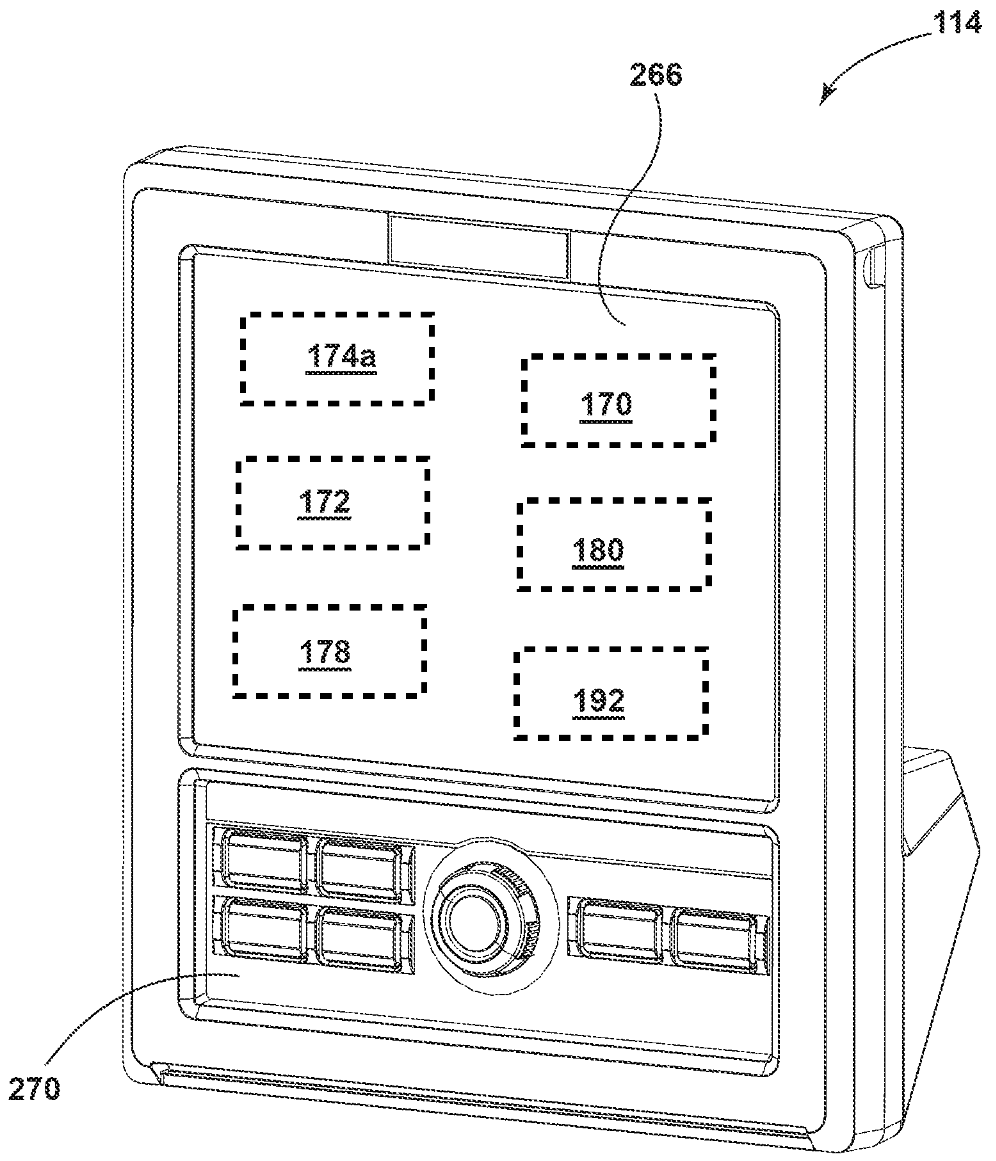
FIG. 21 is a front perspective view of a monitor for use with a pipeline inspection device.
Figure 22:
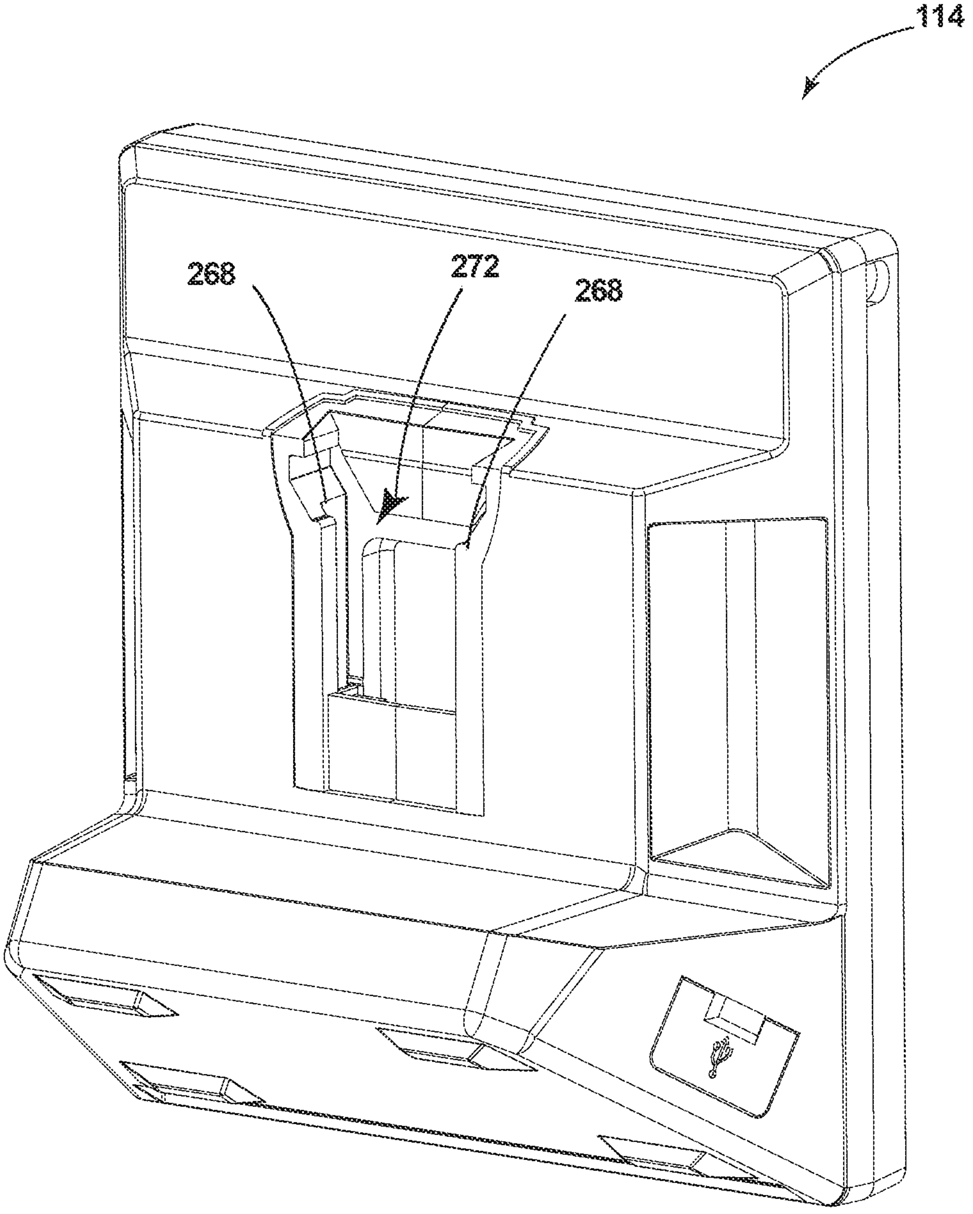
FIG. 22 is a rear perspective view of the monitor illustrated in FIG. 21.

FIGS. 21-22 provide an embodiment of the monitor 114, which can be used with the reels 26, 26*a* illustrated herein. The monitor 114 is configured to engage with the clip 262 on the mount 110*a*. Specifically, the monitor 114 includes a set of rails 268 that form a channel 272. The rails 268 and the channel 272 of the monitor 114 are configured to slidably engage with the rails 260 and the channel 264 on the clip 262 portion of the mount 110*a*. Thus, the monitor 114 can be slide onto the clip 262 to be supported on the reel 26*a*. The monitor 114 includes a display device 266 for viewing an image or video captured by the camera 18, and a user interface 270 for controlling the camera 18 and/or the display device 266. In some embodiments, the user interface 270 may be a separate device from the display device 266. For example, the user interface 270 may be on a user mobile device, such as through an application on a phone. This may allow a user to control the operation of the pipeline inspection device 10 through the application on the phone.

In some embodiments, the display device 266 and the camera 18 are capable of providing high definition images.

Furthermore, in some embodiments, the monitor 114 includes a WiFi hub (i.e., a wireless communication module 178) to allow for wireless communication between the monitor 114 and the hub 30. This allows for the monitor 114 to be removed from the reel 26 while continuing to have a functioning display device 266 showing images captured by the camera 18. In other embodiments, the display 114 may include power and data cables 172 in place of, or in addition to the wireless communication module 178. The monitor 114 may also include a memory storage device 180 or may interface with removable memory storage devices to store the image(s) or video(s) captured by the camera 18.

The user interface 270 includes a control panel (e.g., buttons, touch screen, or rotatable dial) for controlling the operation of one or both of the camera 18 and the display device 266. The user interface 270 may also be used to control the operation of the camera 18. For example, the user interface 270 may enable a user to control lights, take a picture, or start and stop the recording feature of the camera 18. Similarly, the user interface 270 may be used to navigate through the software programs on the display device 266. For example, the user may be able to stop or restart the distance counter that tracks the end of the cable 14 as it extends through the pipe, adjust the brightness of the display device 266, or rearrange the items showing on the display device 266.

Additionally, in some embodiments, the user interface 270 enables a user to "flag" certain troublesome areas of the pipe, or make notes about the condition of the pipe as the camera 18 is pushed through the pipe. For example, in some embodiments, the user interface 270 includes a keyboard and/or a microphone, which allows a user to make notes on what the camera 18 is displaying via the display device 266. A user may be able to use the microphone to make "voiceover" comments on the video. Similarly, the keyboard may enable the user to type in comments that pop up on the video images.

Furthermore, in some embodiments, a processor 192 (i.e., software program) on the monitor 114 may be capable of manipulating the video recorded by the camera 18. For example, the software program can create a compressed highlight reel 26 showing only the portions of the video (or the pictures) that were flagged by a user or include a comment (i.e., voiceover comment or typed comment). The highlight reel 26 skips over the portions of the video or the picture that are not deemed relevant by the user or may not need attention, and instead, compresses the video into a shorter video that only shows the more relevant areas of the pipe under inspection.

The videos can often be long or include lengthy portions of video clips that are not of interest to a user. In addition, while high definition images and video offer some advantages, such as the clarity of image and ability to zoom in on a point of interest, high definition video increases the file size of the videos and requires more storage space on the memory 274. Therefore, in some embodiments, the software program creates a shorter video showing only the points of interest. As a pipe inspection is taking place, points of interest or "highlights" are documented with captured images (which are also stored), text labels and audio clips.

After the original video is created, a second video, the "highlights reel", can be created either with input from the user or automatically. The video is reduced in file size and length by removing the portions of the video that are less important to the viewer. In some embodiments, a user may set a minimum or a maximum file size or footage length for the highlights reel. For example, a user may set the maximum file size to a size that can be emailed. The software program can determine how many seconds of each point of interest to show in order to keep the highlight reel within a certain file size or length. Furthermore, in some embodiments, the software program includes some of the video frames between each highlight in order to show continuity of the video. The software program could decide how often to insert a frame of video between each highlight while still remaining with the designated file size. At any point during the highlight reel, the user can pause the video and inspect the frame as well as zoom in to take a closer look at the pipe. The user can then continue watching the video when desired. In some embodiments, the portion of the video that is not used for the highlights reel is discarded.

In the illustrated embodiment, the monitor 114 includes a second battery **174*a* that is separate from the battery 174 housed in the hub 30. In some embodiments, the pipeline inspection device 10 includes a bi-directional power transfer between the battery 174*a* on the monitor 114 and the battery 174 on the hub 30, such that the battery 174 in the hub 30 and the battery 174*a* in the monitor 114 can be used interchangeably. In other words, when the battery 174 in the hub 30 runs out of power, the battery 174*a* in the monitor 114 can be used as a back up to power both the monitor 114 and the drum 34. Likewise, when the battery 174*a* in the monitor 114 runs out of power, the battery 174 in the hub 30 can be used to power both the monitor 114 and the drum 34. In some embodiments, a USB-C cord can be used to charge can be used to connect either the monitor 114 or the hub 30 to the opposite battery 174, 174*a*. In some embodiments, one of the batteries 174 can be charged through the other battery 174 using a USB-C cord, a cable, or through inductive flow, and visa versa. The charging can be continued until the batteries 174** have equal power and can thus remain powered for the same amount of time.

The electrical and mechanical components of the pipeline inspection device 10 can be arranged in different manners, some including wired connections and some wireless connections. Example embodiments of a wired connection and a wireless connection are provided below. However, in other embodiments, some components communicate wirelessly while others include a direct wired connection.

As shown in FIG. 23, in one embodiment, in order to power the camera 18 and deliver a signal from the camera 18 to a display device 266, power and data cables 172 are connected to the camera 18 and accompany the cable 14 down the sewer. The power and data cables 172 may freely extend side-by-side with the cable 14 or be contained within an outer sheath by or with the cable 14. The battery 174 and video processor 170 are fixedly attached to the hub 30 so as to be rotationally stationary relative to the stand 38. The power and data cables 172 are electrically connected to the hub 30 (e.g., the battery 174 and the video processor 170 hub 30) to provide power to the camera 18 and provide a data signal from the camera 18 to the video processor 170, respectively. However, in order to maintain an electrical connection between the camera 18, the video processor 170, and the battery 174, without twisting the wire connection therebetween, the power and data cables 172 are electrically connected to the battery 174 and the hub 30 by the slip ring 130 connection. The slip ring 130 connection allows for transmission of electrical signals from the power and data cables 172 to the battery 174 and other electrical components in the hub 30, while allowing the drum 34 to rotate relative to the reel 26. In the illustrated embodiment, the monitor 114 is powered by a separate battery from the battery 174 in the hub 30. However, in some embodiments, the monitor 114 is connected by a wired connection to the battery 174 in the hub 30. Also, as previously mentioned, the battery 174 in the hub 30 and the battery in the monitor 114 may be used to power one or both of the hub 30 and the monitor 114 when the opposite battery 174 is out of power. The batteries 174 may each be rechargeable and may be configured to be interchangeably used with other battery 174 powered devices (e.g., power tools).

As shown in FIG. 24, in other embodiments, the battery 174 and the video processor 170 are fixedly attached to the hub 30 and communicate wirelessly to the camera 18 and the monitor 114. For example, in one embodiment, the hub 30, including the video processor 170 and the battery 174, is fixedly attached to the drum 34, and thus rotates with the drum 34 as the cable 14 is spooled and unspooled. This eliminates the need for the slip ring 130. In addition, the wired connection between the hub 30 and the monitor 114 can be replaced with a wireless connection (e.g., Wi-Fi, Bluetooth, etc.) between the video processor 170 and the monitor 114. The hub 30 may contain a wireless communication module 178 for establishing the wireless connection to wirelessly communicate with the monitor 114 and the user interface 270 (if the user interface 270 is a separate unit). The user interface 270 for controlling functions of the camera 18 may be built into the monitor 114, or may communicate wirelessly to the monitor 114 and/or the camera 18. For example, the user interface 270 may be a Wi-Fi enabled smart device that has a software application including a user interface for controlling the camera 18.

In operation, the camera 18 and the cable 14 are fed into the sewer pipeline via the access port by a user. The camera 18 is snaked from the access port through the sewer to the point of interest (e.g., obstruction, blockage, etc.) while the camera 18 sends data signals to the video processor 170 in the hub 30 that are then processed and sent to the monitor 114 to be viewed on the display device 266 by the user.

When the camera 18 reaches the area of interest, the user may physically locate the camera 18 at that location from above ground so that, for example, the user may dig at that spot to access that portion of the sewer pipeline. Accordingly, in some embodiments, the pipeline inspection device 10 includes a locator device 22 to help locate the end of the cable 14 at the location of the camera 18. Alternatively, the camera 18 may include a signal generating module (e.g., a sonde) that emits a point source electromagnetic field (i.e., EM field) which can be detected with a locating device by the user above ground. The module may include an oscillator, transmitter, and antenna within the camera 18. The locator receives the resulting strongest reading of the point source EM field directly above the point source (i.e., the camera 18). However, due to the field being only emitted as a point source originating from the camera 18, it may be difficult for a user to locate. The pipeline may be plastic, metallic, or another similar material.

In some embodiments, the pipeline inspection device 10 may include a signal generating device or transmitter having a first, outgoing electrical cable and a second, return electrical cable. In some embodiments, the transmitter may be a separate device from the pipeline inspection device 10. The transmitter further includes an oscillator and amplifier to generate an alternating electrical signal through the first electrical cable. The signal is returned through the second electrical cable (ground or return path) resulting in current that generates an EM field around the signal path (i.e., along the first and second cable). The oscillator can generate a multitude of frequencies from below approximately 1 KHz to approximately 100 KHz. The user may select a frequency that overcomes conditions present within the buried pipeline, such as pipe conductivity and length, wet or dry ground conditions, etc.

In some embodiments, the cable 14 may include a circuit consisting of the first and second electrical cables of the transmitter extending along the length of the cable 14, such that the alternating electrical signal is transmitted along the cable 14. Accordingly, the alternating signal generates the EM field along the entire path of the cable 14. The EM field can be detected by the user with a locator along the entire length and path of the cable 14 (regardless of the material from which the sewer pipeline is constructed, e.g., metal, plastic, etc.). Effectively, the first and second electrical cables create an antenna that emits the EM field. The locator detects the resulting EM field directly above ground, giving the user pipe position data (e.g., depth, etc.). Since the EM field is detectable with the locator along the entire length of the cable 14, the user may easily follow the EM field (i.e., the cable 14) directly to the location above the camera 18. The locator includes an antenna and receiver that can obtain vector information of the EM field (i.e., both magnitude (signal strength) and signal direction). With this data the user can determine the location of the source of the EM field.

The embodiments described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention. Various features and advantages of the invention are set forth in the following claims.

What is claimed is:

1. A pipeline inspection device, comprising:

a cable including a camera disposed on a distal end of the cable, the camera and the cable configured to be directed into a conduit;

a first drum including a rear wall, a front wall, and a side wall defining an interior, the front wall having an opening providing access to the interior, wherein the cable is disposed at least partially within the first drum;

a stand for supporting the first drum, the first drum being rotatably coupled to the stand; and a hub housing electrical components of the pipeline inspection device, the hub being removably received in the interior of the first drum via the opening, wherein the hub is selectively removable from the first drum and insertable into an interior of a second drum;

wherein the drum is rotatably coupled to the stand by a mounting assembly including a rotatable portion and a fixed portion, wherein the drum is coupled to the stand by the rotatable portion of the mounting assembly, and wherein the hub is supported within the drum by the fixed portion of the mounting assembly, wherein the mounting assembly includes a core, and wherein the hub includes a latch that is engagable with the core to support the hub within the drum, and wherein the core includes a recess, and wherein the hub includes a protrusion that is received within the recess to align the hub within the drum.

2. The pipeline inspection device of claim 1, wherein the mounting assembly includes a rotatable disk having a pair of magnets, and wherein the hub includes sensor for sensing movement of the magnets.

3. The pipeline inspection device of claim 1, wherein the hub includes a channel through which the cable extends, the channel configured to guide the cable into and out of the drum.

4. The pipeline inspection device of claim 1, wherein the hub includes a battery housing configured to removably receive a battery.

5. The pipeline inspection device of claim 1, wherein the camera communicates wirelessly with the monitor or the electrical components in the hub or both.

6. The pipeline inspection device of claim 1, wherein the first drum and the second drum are different sizes.

* * * * *